United States Patent
Sasaki et al.

(10) Patent No.: US 9,852,325 B2
(45) Date of Patent: Dec. 26, 2017

(54) APPARATUS, IMAGE PROCESSING METHOD AND STORAGE MEDIUM STORING PROGRAM

(71) Applicant: CANON KABUSHIKI KAISHA, Tokyo (JP)

(72) Inventors: Takeru Sasaki, Kawasaki (JP); Hiroyasu Kunieda, Yokohama (JP); Yusuke Hashii, Tokyo (JP); Hiroyuki Sakai, Chigasaki (JP); Naoki Sumi, Kawasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 42 days.

(21) Appl. No.: 14/925,234

(22) Filed: Oct. 28, 2015

(65) Prior Publication Data
US 2016/0048724 A1  Feb. 18, 2016

Related U.S. Application Data

(63) Continuation of application No. 13/933,437, filed on Jul. 2, 2013, now Pat. No. 9,208,595.

(30) Foreign Application Priority Data

Jul. 9, 2012 (JP) .................................. 2012-154012

(51) Int. Cl.
*G06K 9/00* (2006.01)
*G06T 11/60* (2006.01)
*G06F 17/30* (2006.01)

(52) U.S. Cl.
CPC ... *G06K 9/00288* (2013.01); *G06F 17/30247* (2013.01); *G06F 17/30256* (2013.01); *G06F 17/30991* (2013.01); *G06T 11/60* (2013.01)

(58) Field of Classification Search
CPC ....... G06T 3/40; G06T 3/4007; G06T 3/4023; H04N 1/3935; H04N 1/393; G11B 27/034
See application file for complete search history.

(56) References Cited

U.S. PATENT DOCUMENTS

| | | | |
|---|---|---|---|
| 5,218,387 A | 6/1993 | Ueno et al. | |
| 5,905,807 A | 5/1999 | Kado et al. | |
| 6,885,760 B2 | 4/2005 | Yamada et al. | |
| 6,895,103 B2 | 5/2005 | Chen et al. | |
| 6,965,684 B2 | 11/2005 | Chen et al. | |
| 8,300,064 B2 | 10/2012 | Yamaji et al. | |
| 8,839,094 B2 | 9/2014 | Pearson et al. | |
| 2007/0146833 A1* | 6/2007 | Satomi | G11B 27/034 358/537 |
| 2010/0260415 A1 | 10/2010 | Sakai et al. | |

(Continued)

FOREIGN PATENT DOCUMENTS

| | | | |
|---|---|---|---|
| JP | 4-024503 A | 1/1992 | |
| JP | 5-197793 A | 8/1993 | |

(Continued)

*Primary Examiner* — Duy M Dang
(74) *Attorney, Agent, or Firm* — Fitzpatrick, Cella, Harper & Scinto

(57) ABSTRACT

Images of a layout target for a template are acquired. The plurality of acquired images are edited using editing processing corresponding to a category corresponding to a layout. The edited images are arranged on the template corresponding to the category.

27 Claims, 41 Drawing Sheets

(56) References Cited

U.S. PATENT DOCUMENTS

| | | |
|---|---|---|
| 2010/0295998 A1 | 11/2010 | Sakai et al. |
| 2014/0009495 A1 | 1/2014 | Sakai et al. |
| 2014/0010459 A1 | 1/2014 | Sumi et al. |

FOREIGN PATENT DOCUMENTS

| | | |
|---|---|---|
| JP | 8-063597 A | 3/1996 |
| JP | 8-077334 A | 3/1996 |
| JP | 10-232934 A | 9/1998 |
| JP | 11-053525 A | 2/1999 |
| JP | 11-250267 A | 9/1999 |
| JP | 2000-105829 A | 4/2000 |
| JP | 2000-132688 A | 5/2000 |
| JP | 2000-235648 A | 8/2000 |
| JP | 2001-216515 A | 8/2001 |
| JP | 2002-183731 A | 6/2002 |
| JP | 2003-030667 A | 1/2003 |
| JP | 2005-322952 A | 11/2005 |
| JP | 2009-260957 A | 11/2009 |
| JP | 2010-251999 A | 11/2010 |
| JP | 2010-273144 A | 12/2010 |
| JP | 2011-166798 A | 8/2011 |
| JP | 2011-186715 A | 9/2011 |
| JP | 2011-524596 A | 9/2011 |

\* cited by examiner

FIG. 10

| SENSING CLASSIFICATION | SENSING SUB-CLASSIFICATION | DATA TYPE | VALUE |
|---|---|---|---|
| BASIC IMAGE FEATURE AMOUNT | AVERAGE LUMINANCE | int | 0~255 |
| | AVERAGE SATURATION | int | 0~255 |
| | AVERAGE HUE | int | 0~359 |
| FACE DETECTION | NUMBER OF PERSON'S FACES | int | 0~MAXFACE |
| | COORDINATE POSITION | int * 8 | 0~Width or Height |
| | AVERAGE Y IN FACE REGION | int | 0~255 |
| | AVERAGE Cb IN FACE REGION | int | -128~127 |
| | AVERAGE Cr IN FACE REGION | int | -128~127 |
| SCENE ANALYSIS | SCENE RESULT | char | Landscape Nightscape Portrait Underexposure Others |

FIG. 11

```xml
<?xml version="1.0" encoding="utf-8" ?>
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                ...
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>
        </UserInfo>
        ...
</IMAGEINFO>
```

FIG. 12

| CLASSIFICATION | CONTENTS | DATA TYPE | VALUE |
|---|---|---|---|
| IMAGE | FAVORITE RATE | int | 0~5 |
| | EVENT | char | "travel" "graduation" "wedding" |
| | | | |
| PERSON | NAME | char | "NAME" |
| | BIRTHDAY | char | YYYYMMDD |
| | FAMILY RELATIONSHIP | char | "family" "" |
| | | | |

```
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 20

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

F I G. 24

| CATEGORY | CONTENTS | SCORE RANGE | DEGREE OF IMPORTANCE FOR EACH THEME(WEIGHT W) | | |
|---|---|---|---|---|---|
| | | | growth | travel | ... |
| INDIVIDUAL IMAGE EVALUATION | BRIGHTNESS APPROPRIATENESS | 0~100 | 0.5 | 1.0 | |
| | SATURATION APPROPRIATENESS | 0~100 | 0.5 | 1.0 | |
| | | | | | |
| IMAGE/SLOT MATCHING EVALUATION | PERSON MATCHING | 0~100 | 1.0 | 0.5 | |
| | TRIMMING LOSS DETERMINATION | 0~100 | 1.0 | 0.5 | |
| | | | | | |
| IN-PAGE BALANCE EVALUATION | IMAGE SIMILARITY | 0~100 | 0.5 | 1.0 | |
| | HUE VARIATION | 0~100 | 0.5 | 1.0 | |
| | FACE SIZE VARIATION | 0~100 | 0.5 | 1.0 | |
| OTHERS | USER'S TASTE | 0~100 | 0.8 | 0.8 | |
| | | | | | |

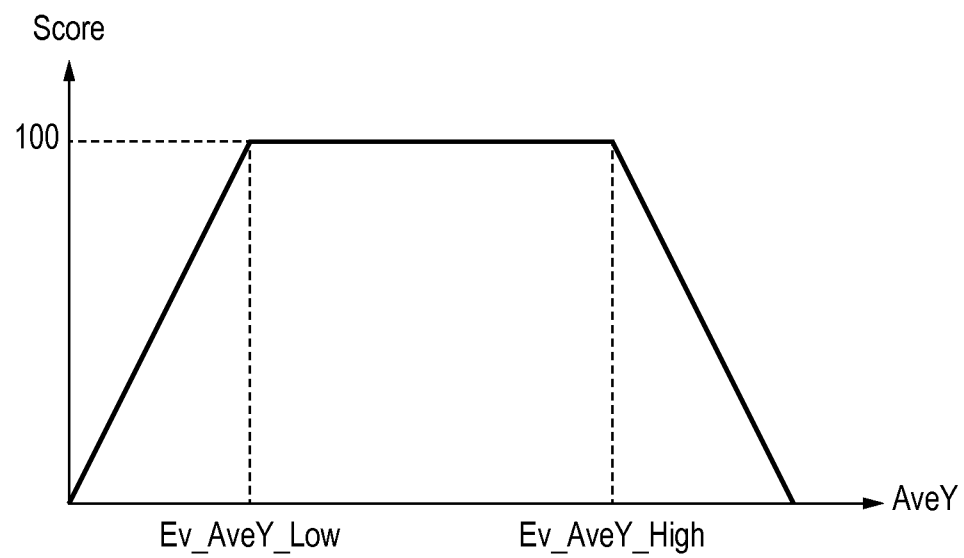
F I G. 25
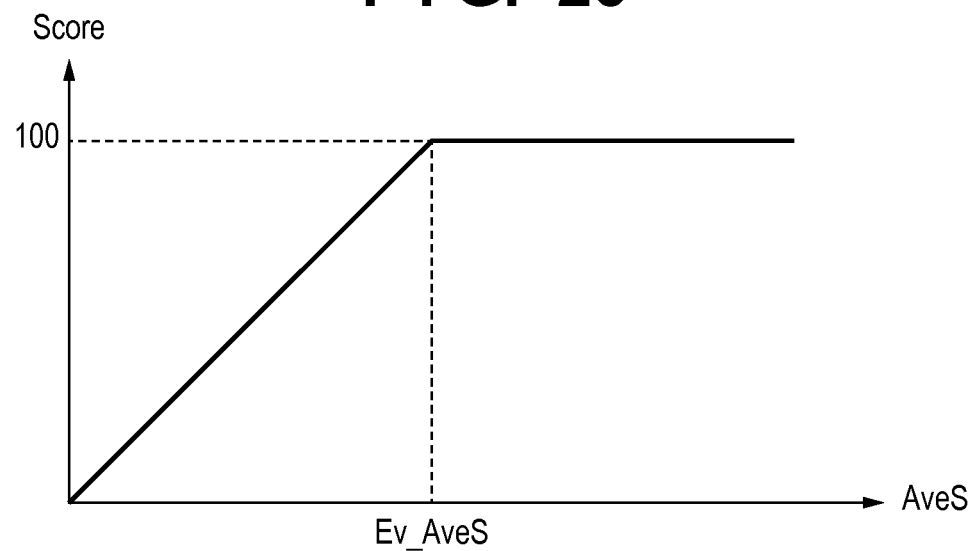
F I G. 26

| IMAGE ID | CAPTURING DATE/TIME(YYYYMMDD : HHMMSS) |
|---|---|
| 25 | 20100101 : 120000 |
| 86 | 20100101 : 150000 |
| 102 | 20100101 : 170000 |
| 108 | 20100101 : 173000 |

F I G. 29
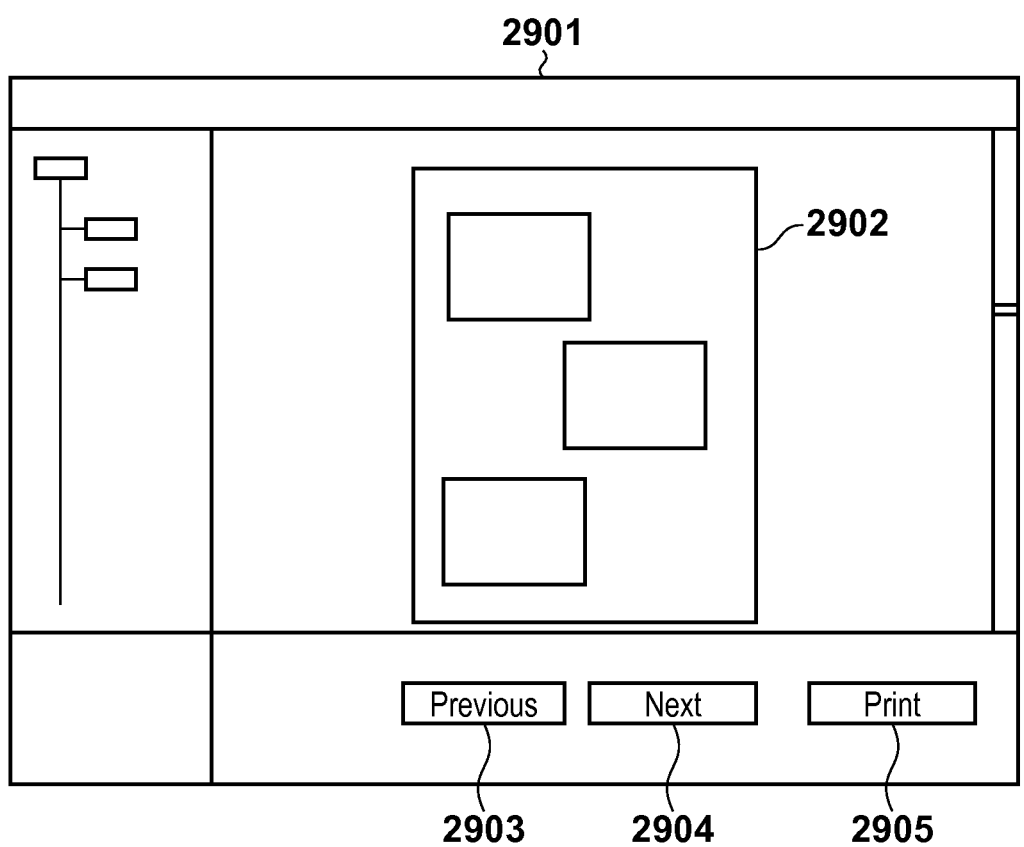

FIG. 30

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

.......

</LayoutInfo>
```

FIG. 31

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 32

```xml
<?xml version="1.0" encoding="utf-8" ?>
<LayoutInfo>
    <BASIC>
        <Theme>growth</Theme>
        <PageSize>A4</PageSize>
        <Resolution>300</Resolution>
        <MainGroup>son</MainGroup>
        <SubGroup>son, father</SubGroup>
    </BASIC>
    <ImageSlot>
        <ID>0</ID>
        <POSITION>
            <LeftTop x=400, y=900/>
            <LeftBottom x=400, y=1500/>
            <RightTop x=1300, y=900/>
            <RightBottom x=1300, y=1500/>
        </POSITION>
        <Shape>Rectangle</Shape>
        <PersonGroup>SubGroup</PersonGroup>
        <ImageID>0x00000001</ImageID>
        <TrimingRatio>50.0</TrimingRatio>
    </ImageSlot>
    <ImageSlot>
        <ID>1</ID>
        <POSITION>
            <LeftTop x=700, y=100/>
            <LeftBottom x=700, y=500/>
            <RightTop x=1100, y=100/>
            <RightBottom x=1100, y=500/>
        </POSITION>
        <Shape>ellipse</Shape>
        <PersonGroup>MainGroup</PersonGroup>
        <ImageID>0x00000089</ImageID>
        <TrimingRatio>38.0</TrimingRatio>
    </ImageSlot>
    <ImageSlot>
        <ID>2</ID>
        <POSITION>
            <LeftTop x=1100, y=200/>
            <LeftBottom x=1100, y=600/>
            <RightTop x=1450, y=200/>
            <RightBottom x=1450, y=600/>
        </POSITION>
        <Shape>ellipse</Shape>
        <PersonGroup>MainGroup</PersonGroup>
        <ImageID>0x00000129</ImageID>
        <TrimingRatio>53.0</TrimingRatio>
    </ImageSlot>
    .......
</LayoutInfo>
```

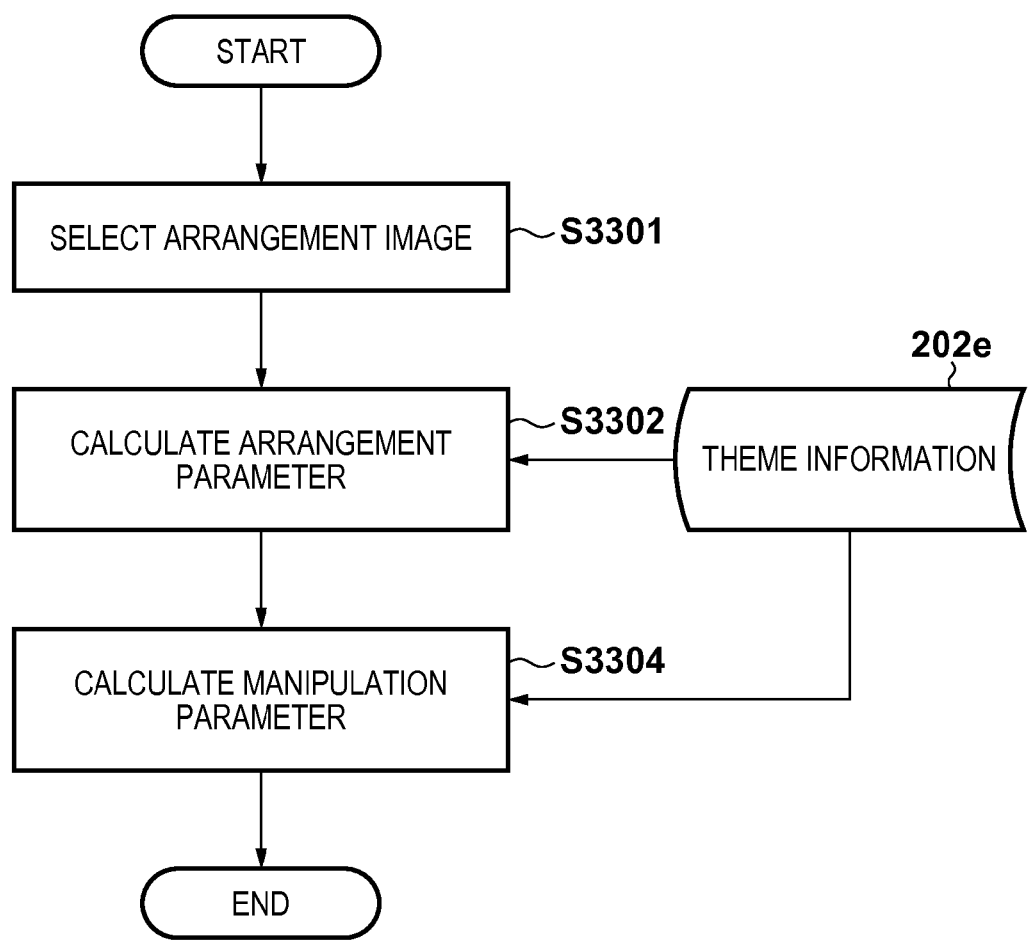

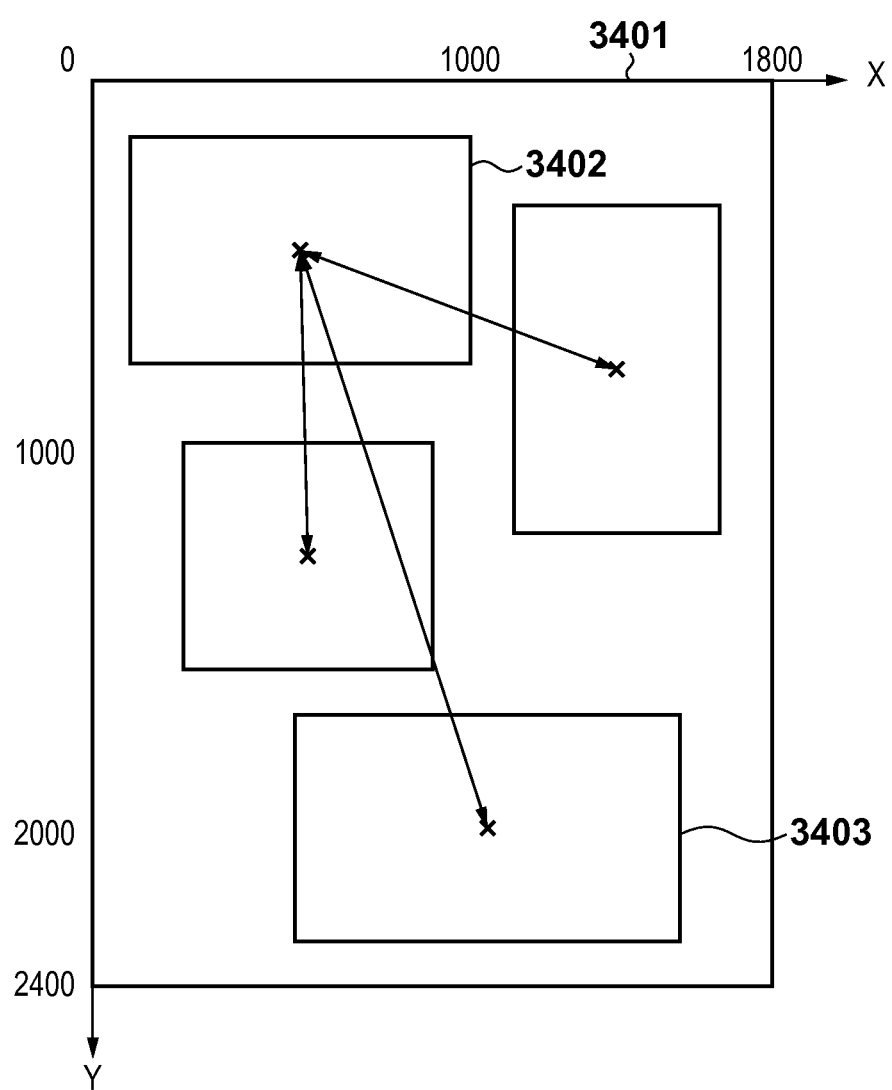

FIG. 37

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimingRatio>50.0</TrimingRatio>
                <Contrast>-5<Contrast>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimingRatio>38.0</TrimingRatio>
                <Contrast>-10<Contrast>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimingRatio>53.0</TrimingRatio>
                <Contrast>-12<Contrast>
        </ImageSlot>

.......

</LayoutInfo>
```

F I G. 38
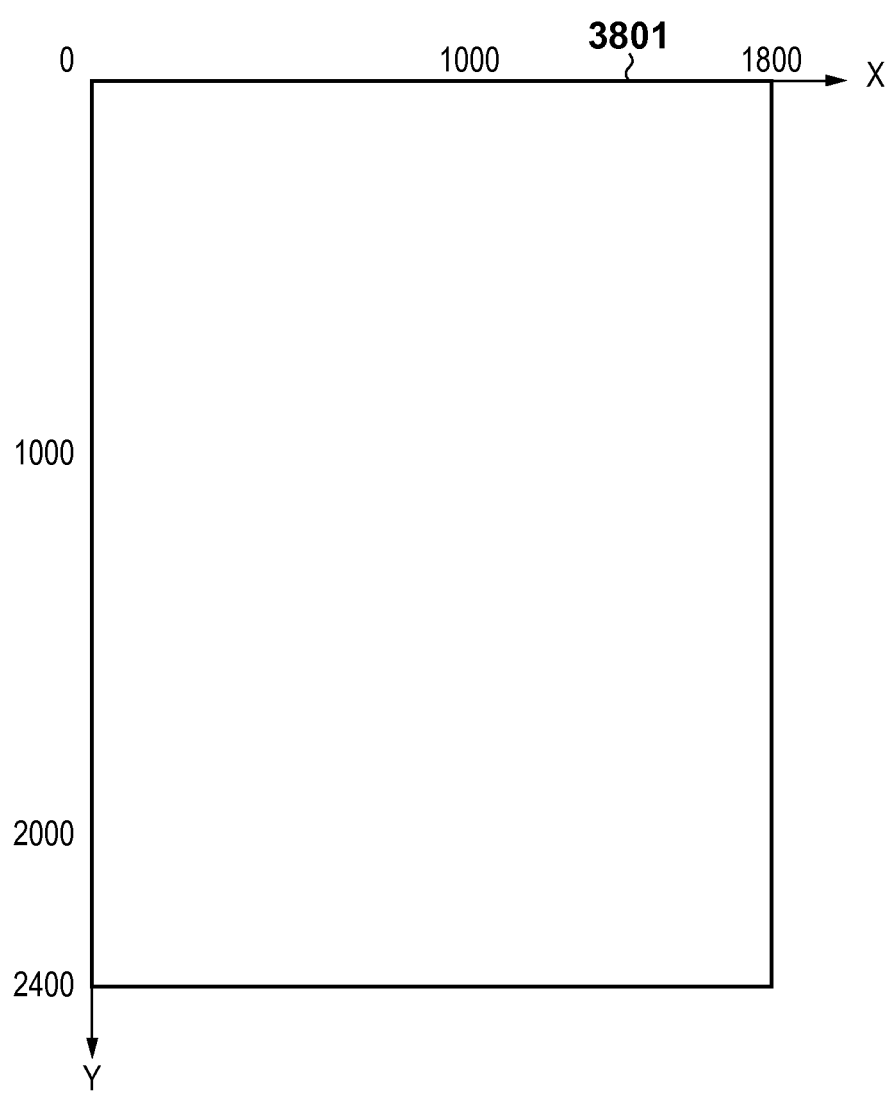

F I G. 39

```
<?xml version="1.0" encoding="utf-8" ?>
<LayoutInfo>
        <BASIC>
                    <Theme></Theme>
                    <PageSize>A4</PageSize>
                    <Resolution>300</Resolution>
        </BASIC>

</LayoutInfo>
```

F I G. 41

| ITEM | THEME | |
|---|---|---|
| | GROWTH RECORD "growth" | TRAVEL "travel" |
| UPPER LIMIT OF NUMBER N OF SLOTS | 15 | 6 |
| LOWER LIMIT OF NUMBER N OF SLOTS | 8 | 1 |
| BASIC SIZE OF SLOT | 400×400 | 800×800 |
| UPPER LIMIT OF VARIATION WIDTH OF SIDE OF SLOT | 100 | 400 |
| LOWER LIMIT OF VARIATION WIDTH OF SIDE OF SLOT | −100 | −200 |
| RATIO OF IMAGES IN WHICH PERSON OF INTEREST IS ARRANGED TO ALL ARRANGED IMAGES | 100% | 50% |

F I G. 42
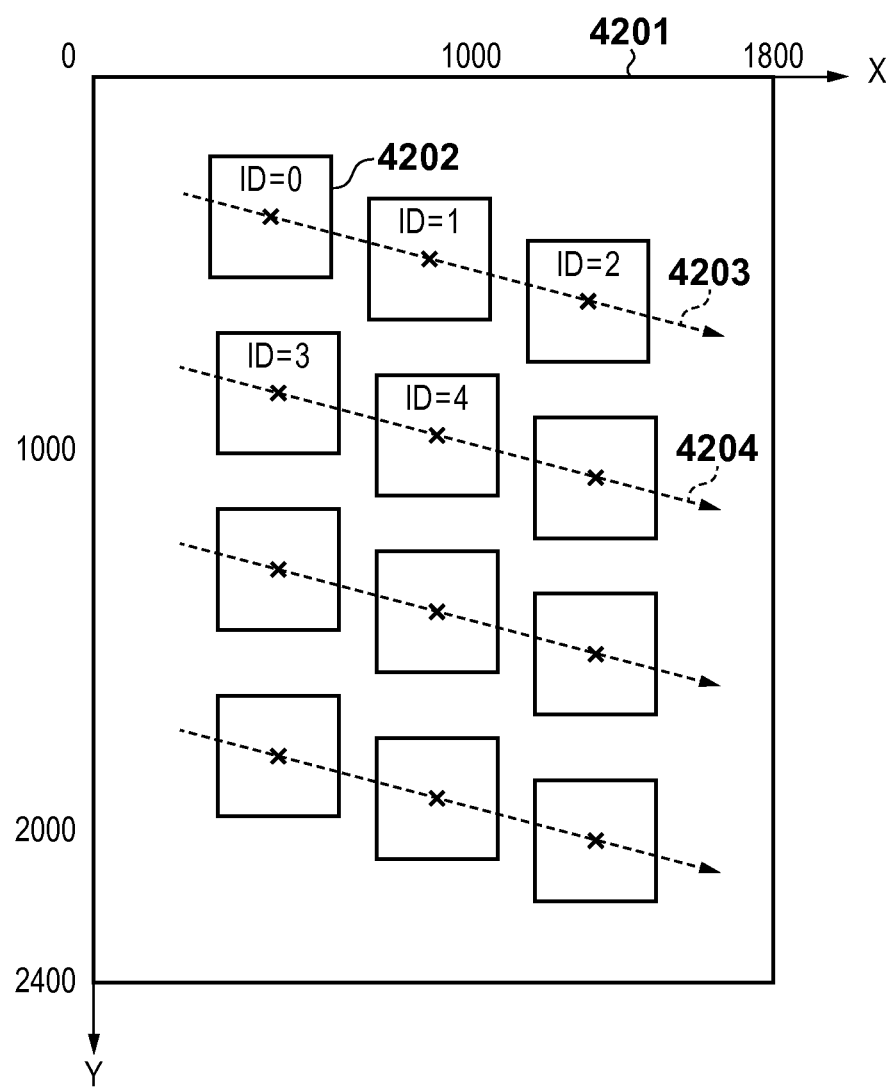

F I G. 45

```xml
<?xml version="1.0" encoding="utf-8" ?>
<LayoutInfo>
        <BASIC>
                    <Theme>travel</Theme>
                    <PageSize>A4</PageSize>
                    <Resolution>300</Resolution>
                    <MainGroup>son, mother, father</MainGroup>
        </BASIC>
        <ImageSlot>
                    <ID>0</ID>
                    <POSITION>
                            <LeftTop x=100, y=200/>
                            <LeftBottom x=100, y=800/>
                            <RightTop x=1000, y=200/>
                            <RightBottom x=1000, y=800/>
                    </POSITION>
        </ImageSlot>
        <ImageSlot>
                    <ID>1</ID>
                    <POSITION>
                            <LeftTop x=800, y=700/>
                            <LeftBottom x=800, y=1500/>
                            <RightTop x=1700, y=700/>
                            <RightBottom x=1700, y=1500/>
                    </POSITION>
        </ImageSlot>
        <ImageSlot>
                    <ID>2</ID>
                    <POSITION>
                            <LeftTop x=300, y=1700/>
                            <LeftBottom x=300, y=2300/>
                            <RightTop x=1200, y=1700/>
                            <RightBottom x=1200, y=2300/>
                    </POSITION>
        </ImageSlot>
</LayoutInfo>
```

| ITEM | THEME | |
| --- | --- | --- |
| | GROWTH RECORD "growth" | TRAVEL "travel" |
| ARRANGEMENT PARAMETER CALCULATION ALGORITHM | COMPLY WITH CAPTURING DATE/TIME AND SLOT ID | COMPLY WITH CAPTURING DATE/TIME AND DISTANCE BETWEEN SLOTS |

FIG. 48

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=100/>
                        <LeftBottom x=100, y=700/>
                        <RightTop x=1000, y=100/>
                        <RightBottom x=1000, y=700/>
                </POSITION>
                <Shape>Rectangle</Shape>
        </ImageSlot>
        <ImageSlot>
                <ID>1</ID>
                <POSITION>
                        <LeftTop x=100, y=1000/>
                        <LeftBottom x=100, y=1800/>
                        <RightTop x=700, y=1000/>
                        <RightBottom x=700, y=1800/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=800, y=800/>
                        <LeftBottom x=800, y=1400/>
                        <RightTop x=1400, y=800/>
                        <RightBottom x=1400, y=1400/>
                </POSITION>
                <Shape>Rectangle</Shape>
                <PersonGroup>MainGroup</PersonGroup>
        </ImageSlot>
        <ImageSlot>
                <ID>3</ID>
                <POSITION>
                        <LeftTop x=900, y=1500/>
                        <LeftBottom x=900, y=2300/>
                        <RightTop x=1700, y=1500/>
                        <RightBottom x=1700, y=2300/>
                </POSITION>
                <Shape>Rectangle</Shape>
        </ImageSlot>
</LayoutInfo>
```

APPARATUS, IMAGE PROCESSING METHOD AND STORAGE MEDIUM STORING PROGRAM

This application is a continuation of application Ser. No. 13/933,437, filed Jul. 2, 2013, which has been allowed.

BACKGROUND OF THE INVENTION

Field of the Invention

The present invention relates to an apparatus for executing image processing for image data, an image processing method, and a storage medium storing a program.

Description of the Related Art

There exists a technique of creating a collage or an album by combining a plurality of photos.

There also exists a technique of automatically creating a layout when creating a collage or an album.

Japanese Patent Laid-Open No. 2009-260957 describes a technique of automatically editing images based on editing information preset for the images to be arranged in the image merging frames of a template to be used at the time of layout creation, thereby creating a layout.

However, the above-described patent literature has the following problem. In Japanese Patent Laid-Open No. 2009-260957, editing instructions for the images to be arranged are permanently set in the template. For this reason, it may be impossible to appropriately edit the images.

SUMMARY OF THE INVENTION

An aspect of the present invention is to eliminate the above-mentioned problems with the conventional technology. The present invention provides an apparatus capable of performing appropriate editing processing for images to be arranged on a template, an image processing method, and a storage medium storing a program.

The present invention in its first aspect provides an apparatus comprising: an acquisition unit configured to acquire an image of a layout target for a template; an editing unit configured to edit the image acquired by the acquisition unit using editing processing corresponding to a category of the template; and an arranging unit configured to arrange the image edited by the editing unit on the template corresponding to the category.

According to the present invention, it is possible to perform appropriate editing processing for images because editing processing in accordance with the theme of a template.

Further features of the present invention will become apparent from the following description of exemplary embodiments with reference to the attached drawings.

BRIEF DESCRIPTION OF THE DRAWINGS

FIG. 10 is a table showing an example of attribute information obtained by image analysis;

FIG. 11 is a view showing an example of an image analysis result saving format;

FIG. 12 is a table showing an example of attribute information that can manually be input by a user;

FIG. 18 is a view showing an example of the holding format of the layout template shown in FIG. 17;

FIG. 20 is a view showing an example of the holding format of the layout template shown in FIG. 19;

FIG. 24 is a table showing an example of layout evaluation values when performing automatic layout;

FIG. 25 is a graph for explaining a method of calculating brightness appropriateness;

FIG. 26 is a graph for explaining a method of calculating saturation appropriateness;

FIG. 29 is a view showing a display example of an automatic layout generation result;

FIG. 30 is a view showing an example of holding a decided theme and main character information;

FIG. 31 is a view showing an example of holding a decided theme and main character information;

FIG. 32 is a view showing an example of holding generated automatic layout information;

FIG. 33 is a flowchart of layout generation processing;

FIG. 34 is a view showing an example of image arrangement in slots;

FIG. 37 is a view showing an example of holding generated automatic layout information;

FIG. 38 is a view showing an example of a layout template;

FIG. 39 is a view showing an example of the holding format of the layout template shown in FIG. 38;

FIG. 41 is a table showing an example of arrangement parameters according to the third embodiment;

FIG. 42 is a view showing an example of slot arrangement;

FIG. 45 is a view showing an example of holding generated automatic layout information;

FIG. 48 is a view showing an example of holding generated automatic layout information.

DESCRIPTION OF THE EMBODIMENTS

Figure 1:
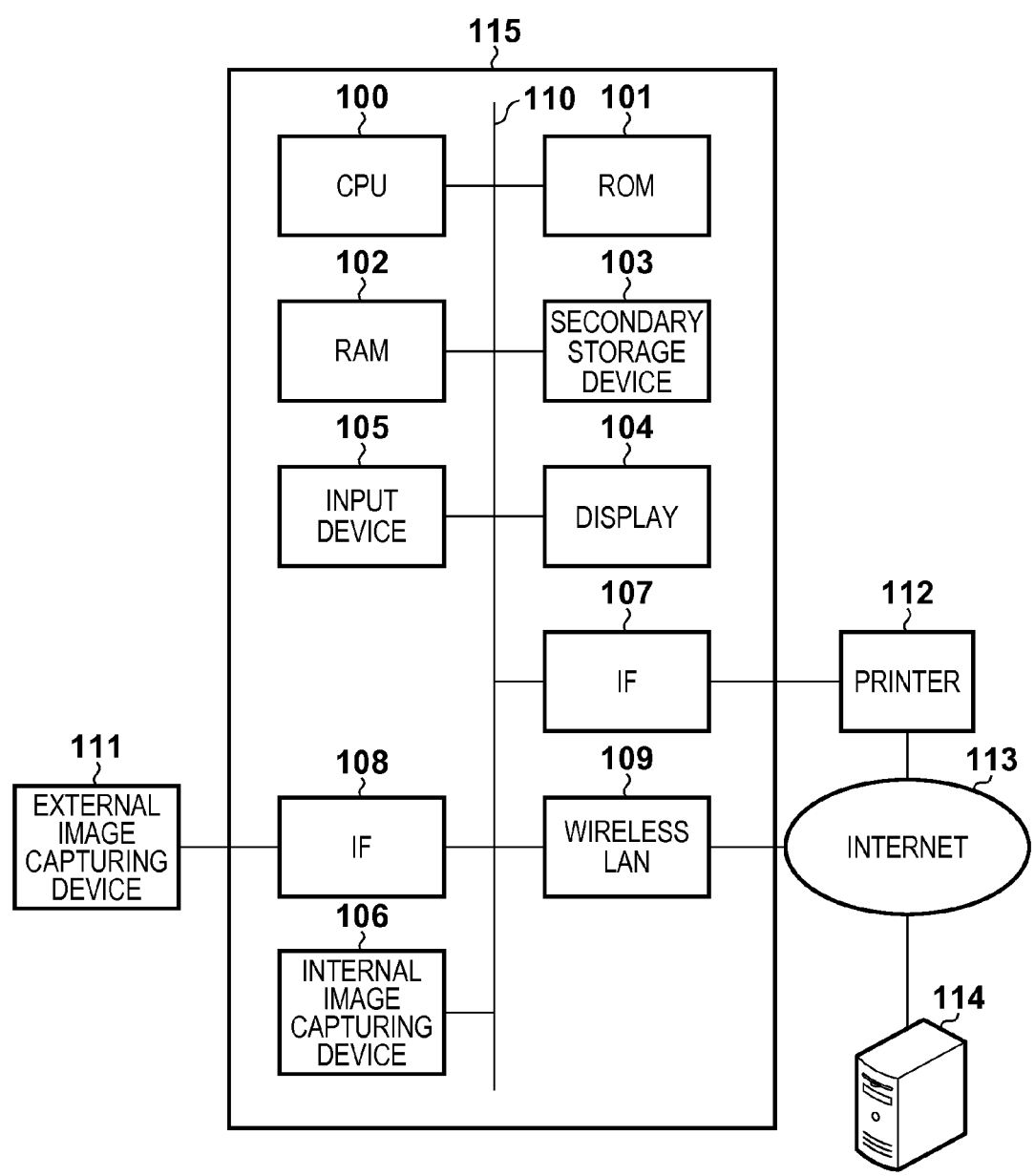
FIG. 1 is a block diagram showing a hardware arrangement capable of executing software of the present invention.

Preferred Embodiments of the Present Invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

An embodiment for automatically generating a layout output matter using an input image group will be described below. This merely exemplifies a form of implementation, and the present invention is not limited to the following embodiment.

Note that in this embodiment, the layout output matter is assumed to be a collage output matter formed from one page for the sake of simplicity. However, the layout output matter may be an album output including a plurality of pages.

FIG. 1 is a block diagram for explaining an example of the hardware arrangement of an information processing apparatus according to the first embodiment. Referring to FIG. 1, an information processing apparatus 115 includes a CPU 100, a ROM 101, a RAM 102, a secondary storage device 103, a display device 104, an input device 105, an IF 107, an IF 108, and a wireless LAN 109. The information processing apparatus also includes an internal image capturing device 106. They are connected to each other via a control bus/data bus 110. The information processing apparatus 115 of this embodiment functions as an image processing apparatus.

Referring to FIG. 1, the CPU (Central Processing Unit) 100 executes an information processing method to be described in this embodiment in accordance with programs such as an application. The ROM 101 stores the programs to be executed by the CPU 100. The RAM 102 provides a memory to temporarily store various kinds of information when the CPU 100 executes the programs. The secondary storage device 103 is formed from a hard disk or the like and serves as a storage medium to save, for example, a database that saves image files and image analysis results. The display device 104 is, for example, a display, and provides the user processing results of this embodiment and various kinds of UIs (User Interfaces) to be described below. The display device 104 may have a touch panel function. The control bus/data bus 110 connects the above-described units to the CPU 100. The information processing apparatus also includes the input device 105 such as a pointing device or a keyboard used by the user to input an image correction processing instruction and the like.

The information processing apparatus 115 serving as an image processing apparatus may include the internal image capturing device 106. An image captured by the internal image capturing device 106 undergoes predetermined image processing and is saved in the secondary storage device 103. The information processing apparatus 115 may load images from the external image capturing device 111 connected via the interface (IF 108). The information processing apparatus 115 also includes the wireless LAN (Local Area Network) 109. The LAN is connected to the Internet 113. The information processing apparatus 115 can also acquire image data from an external server 114 connected to the Internet 113.

Finally, a printer 112 for outputting an image or the like is connected to the information processing apparatus 115 via the IF 107. Note that the printer is also connected to the Internet so that print data can be transmitted/received via the wireless LAN 109.

Figure 2:
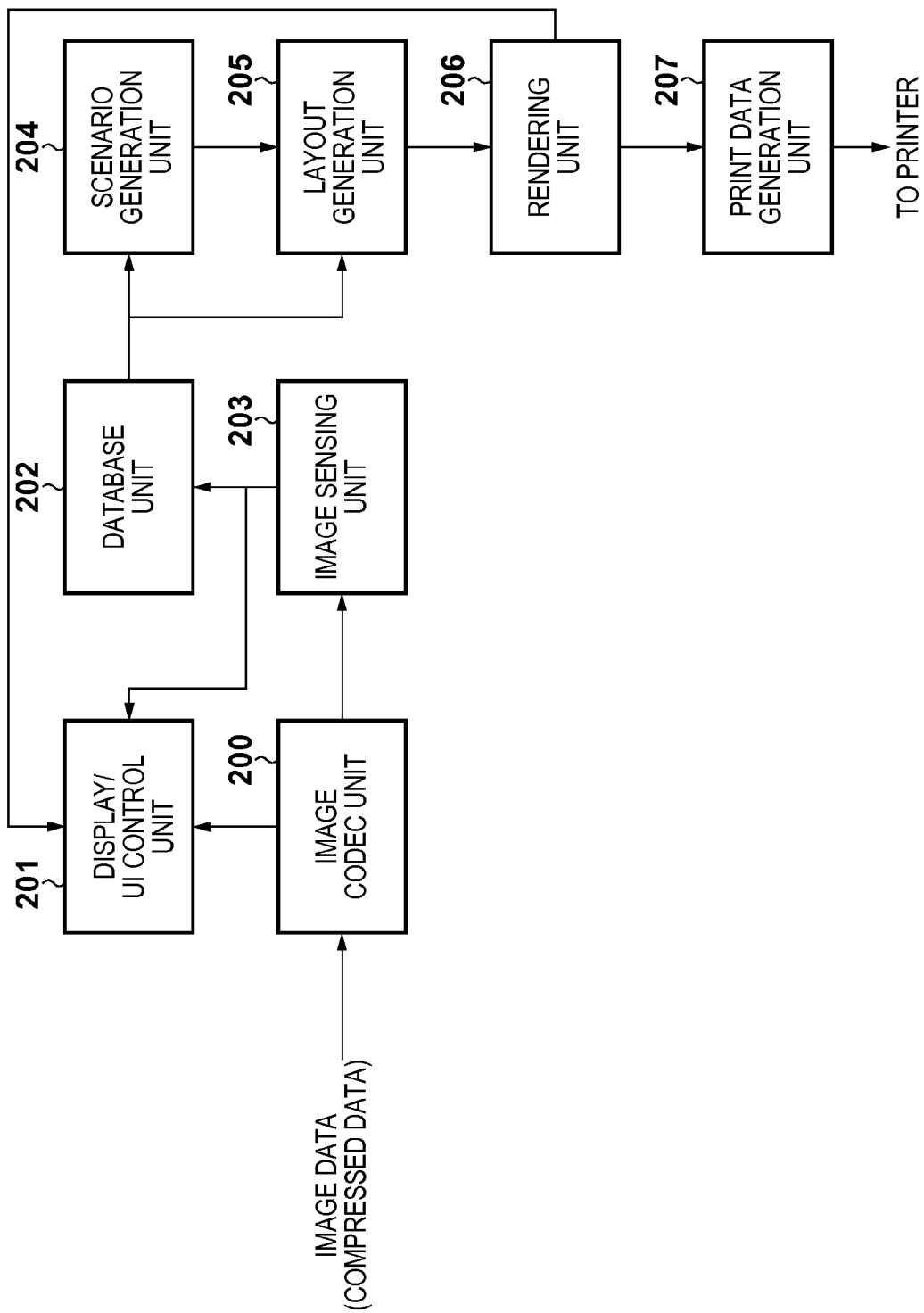
FIG. 2 is a block diagram showing a software configuration of processing of the present invention.

FIG. 2 is a block diagram of a basic software configuration including an application according to this embodiment.

Image data acquired by the information processing apparatus 115 normally has a compression format such as JPEG (Joint Photography Expert Group). Hence, an image codec unit 200 decompresses the compression format and converts it into a so-called RGB dot-sequential bitmap data format. The converted bitmap data is sent to a display/UI control unit 201 and displayed on the display device 104 such as a display.

The bitmap data is also input to an image sensing unit 203 (application), which performs various kinds of analysis processing of the image (details to be described later). Various kinds of attribute information of the image obtained by the analysis processing are saved in the above-described secondary storage device 103 by a database 202 (application) in accordance with a predetermined format. Note that image analysis processing and sensing processing will be handled in the same sense hereinafter.

A scenario generation unit 204 (application) generates conditions of a layout to be automatically generated in accordance with various conditions input by the user (details to be described later). A layout generation unit 205 performs processing of automatically generating a layout in accordance with the scenario.

A rendering unit 206 generates the bitmap data of the generated layout for display. The bitmap data is sent to the display/UI control unit 201, and the result is displayed on the display device 104.

The rendering result is also sent to a print data generation unit 207 which converts the bitmap data into printer command data and sends it to a printer (print control).

The flowcharts of the most basic processing will be described below.

Figure 3:
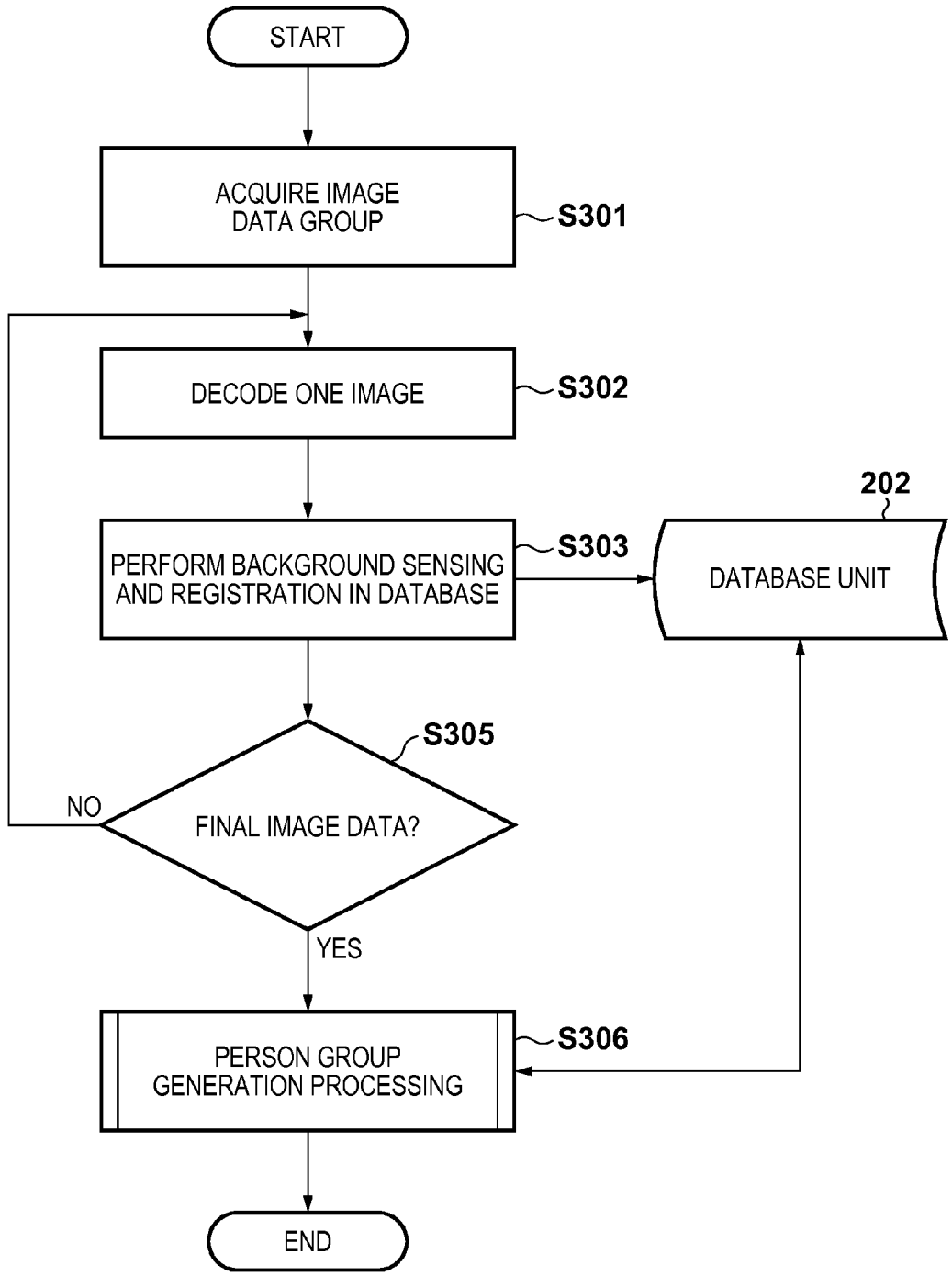
FIG. 3 is a flowchart of image analysis processing.
Figure 4:
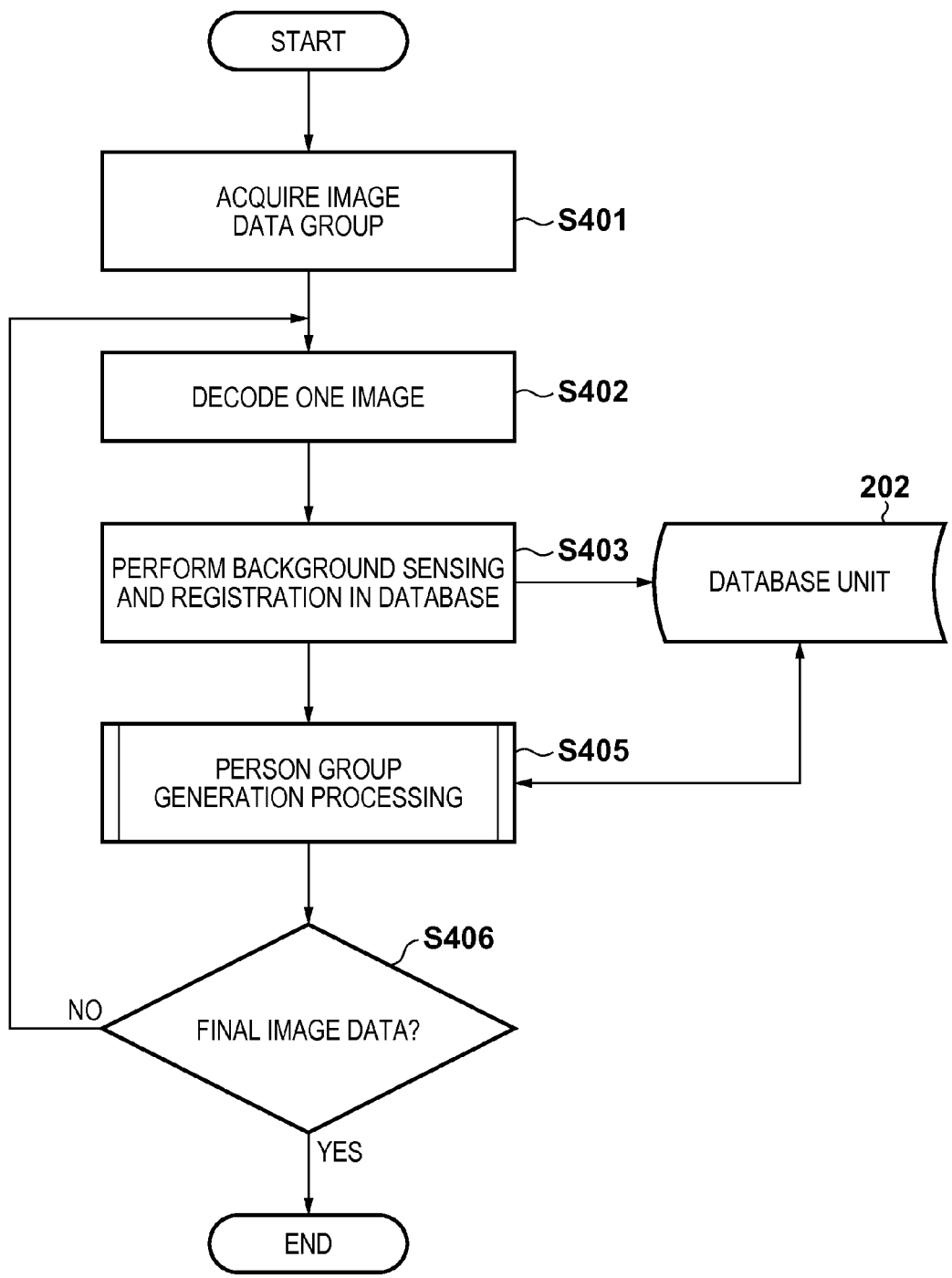
FIG. 4 is a flowchart of image analysis processing.

FIGS. 3 and 4 illustrate the procedure of the image sensing unit 203 or the procedure of acquiring a plurality of image data groups, performing analysis processing for each of them, and storing the result in the database.

Figure 5:
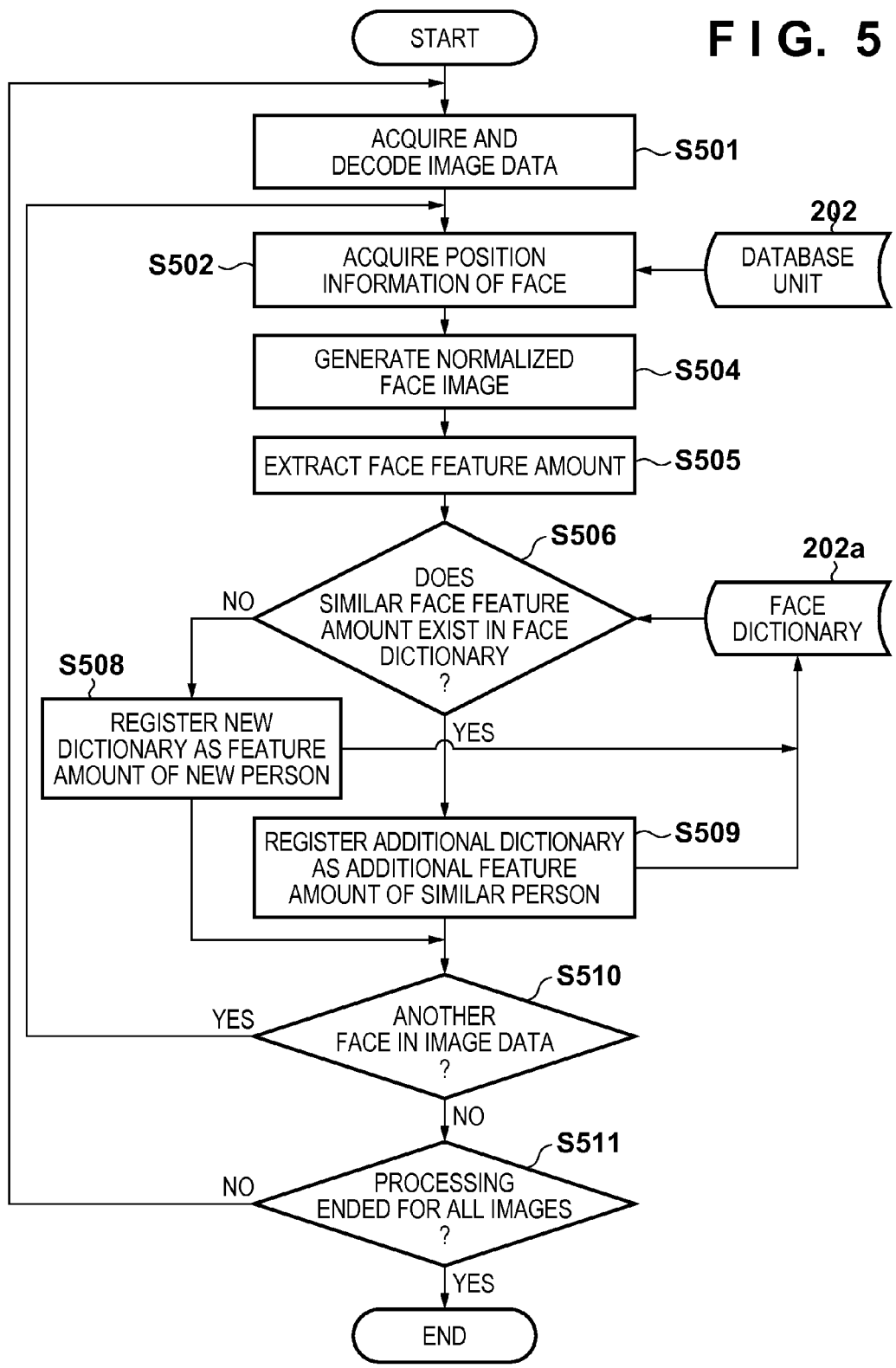
FIG. 5 is a flowchart of person group generation processing.

FIG. 5 illustrates the procedure of processing of grouping face information supposed to be of the same person based on detected face position information.

Figure 6:
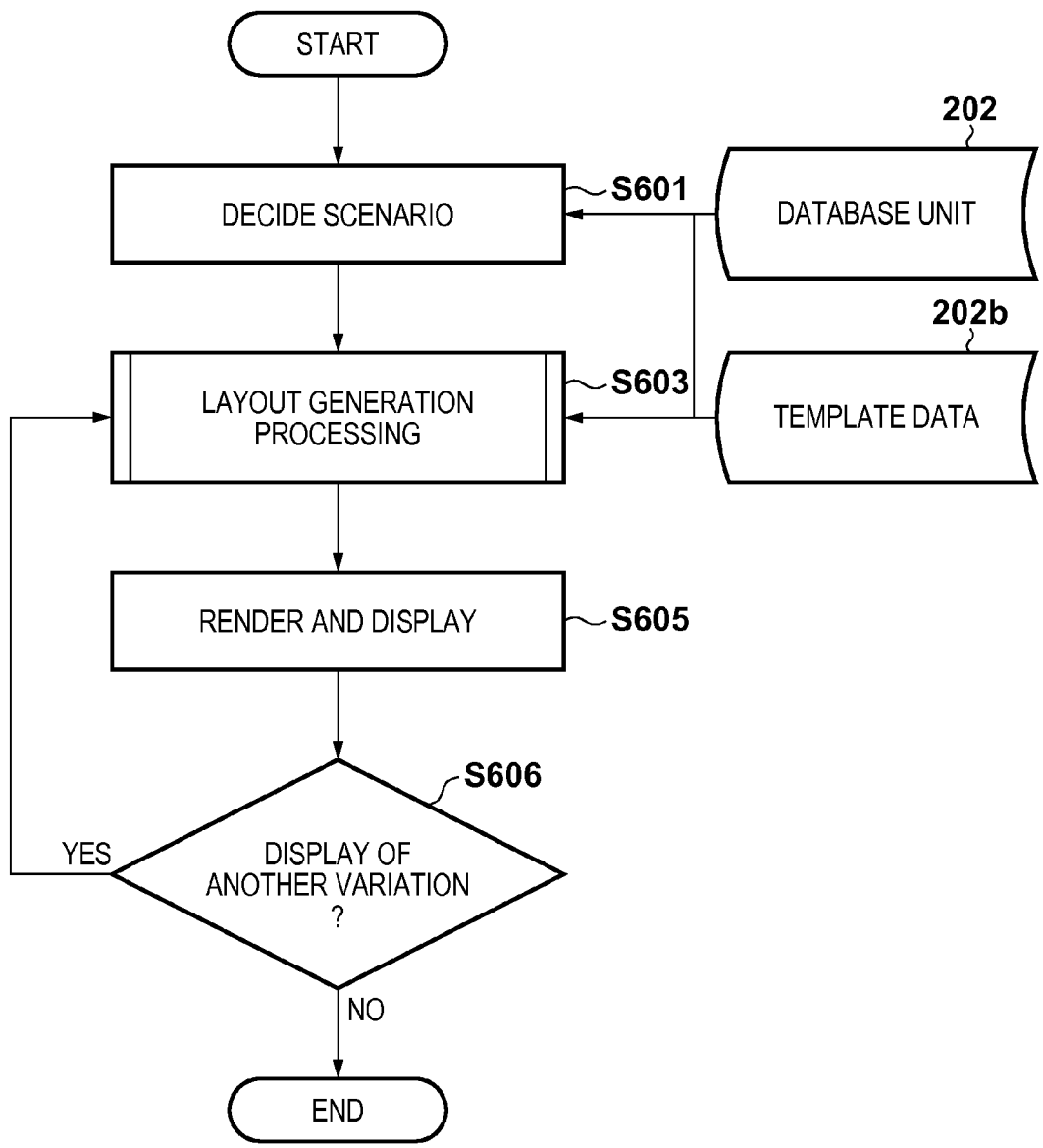
FIG. 6 is a flowchart of automatic layout proposal processing.

FIG. 6 illustrates the procedure of processing of deciding a scenario for layout creation based on the analysis information of an image and various kinds of information input by the user and automatically generating a layout based on the scenario.

Each processing will be described below in accordance with the flowcharts.

<Image Acquisition>

In step S301 of FIG. 3, an image data group is acquired. To acquire the image data group, for example, the user connects an image capturing apparatus or memory card storing captured images to the information processing apparatus 115, thereby loading the captured images. Images captured by the internal image capturing device and saved in the secondary storage device can also be loaded, as a matter of course. Alternatively, the images may be acquired from a place other than the information processing apparatus 115, for example, the external server 114 connected to the Internet via the wireless LAN.

Figure 8:
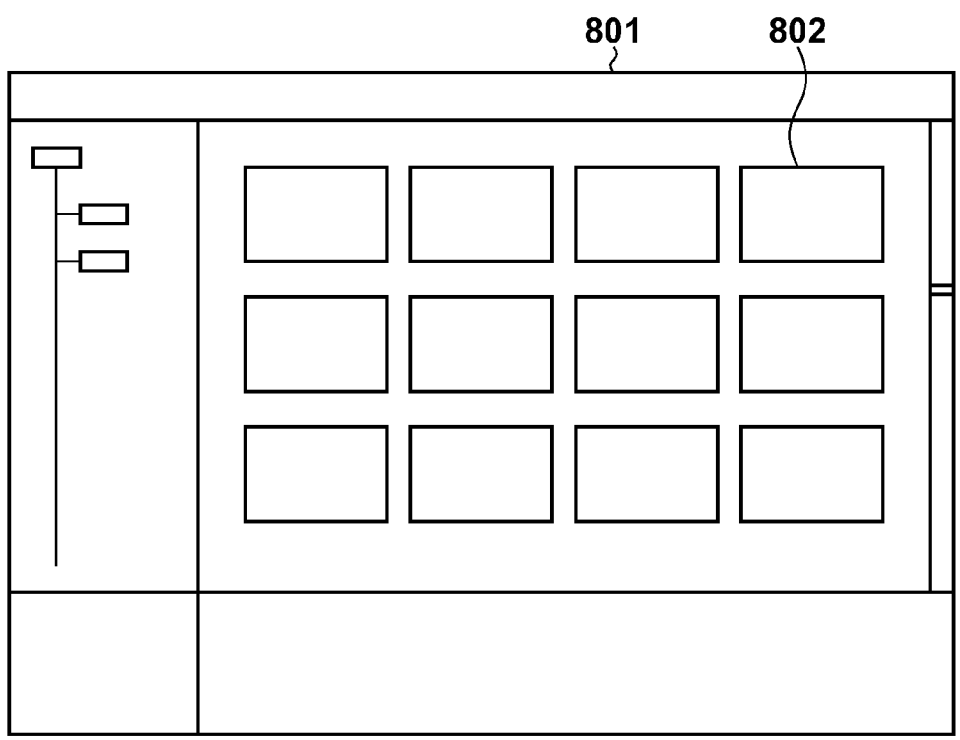
FIG. 8 is a view showing a display example of an image group in a thumbnail format.
Figure 9:
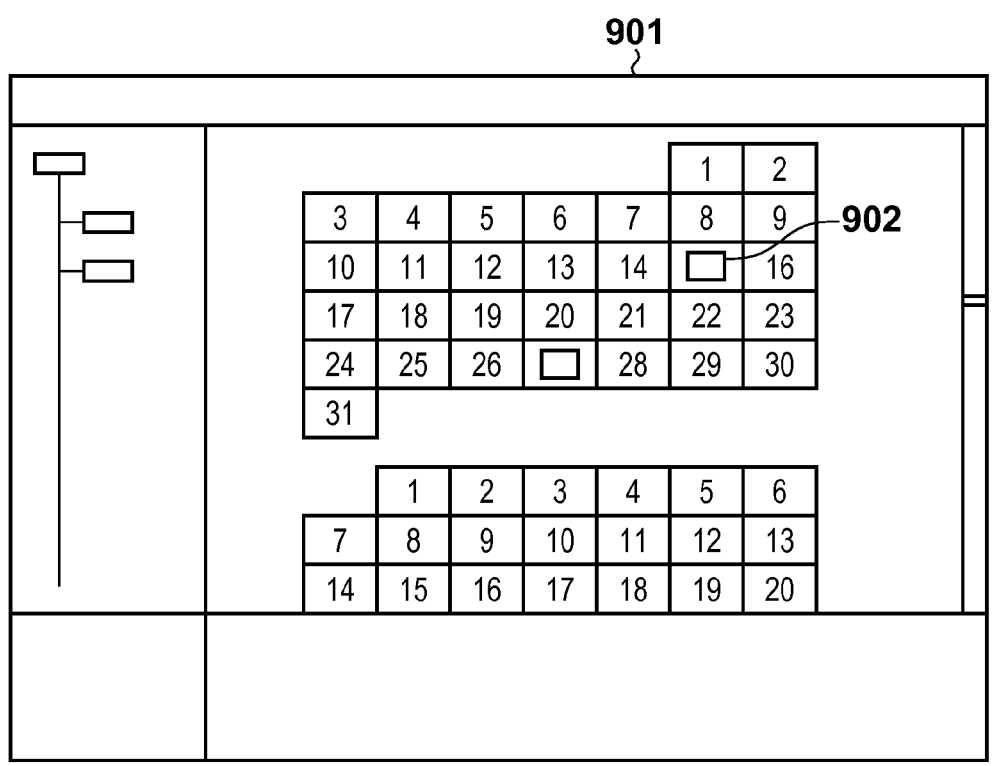
FIG. 9 is a view showing a display example of an image group in a calendar format.

When an image data group is acquired, a thumbnail group is displayed on a UI, as shown in FIG. 8 or 9. Thumbnails 802 of the images may be displayed for each folder in the secondary storage device, as indicated by 801 in FIG. 8. Alternatively, the images may be managed for each date on a UI 901 like a calendar, as shown in FIG. 9. When the user clicks on a date portion 902, images captured that day are displayed in a thumbnail list, as shown in FIG. 8.

<Background Sensing and DB Registration>

In the flowchart of FIG. 3, analysis processing and analysis result database registration are performed for each acquired image data group.

That is, in step S302, the application searches for an image newly saved and yet to undergo sensing processing. The codec unit converts each extracted image from compressed data to bitmap data.

In step S303, various kinds of sensing processing are executed for the bitmap data. The sensing processing here is assumed to include various kinds of processing as shown in FIG. 10. In this embodiment, face detection, face region feature amount analysis, image feature amount analysis, and scene analysis are exemplified as the sensing processing. Results of data types as shown in FIG. 10 are calculated.

Each sensing processing will be explained below.

The average luminance and the average saturation of an entire image, which are the basic image feature amounts, can be obtained by a known method, and a detailed description thereof will be omitted. As an outline, the R, G, and B components of each pixel of the image are converted into known luminance and color difference components (for example, Y, Cb, and Cr components), and the average value of the Y components is obtained. For the average saturation, the Cb and Cr components are calculated for each pixel by, $$S = \sqrt{Cb^2 + Cr^2} \quad (1)$$

and the average value of S is obtained.

The average hue AveH in an image may be calculated as a feature amount to evaluate the tone of the image. The hue of each pixel can be obtained using a known HIS conversion formula. The values are averaged in the entire image, thereby obtaining AveH.

The feature amounts need not be calculated for the entire image. For example, the image may be divided into regions having a predetermined size, and the feature amounts may be calculated for each region.

Person's face detection processing will be described next. Various methods have already been proposed as the person's face detection method used in this embodiment. According to Japanese Patent Laid-Open No. 2002-183731, an eye region is detected from an input image, and a region around the eye region is set as a face candidate region.

The luminance gradient and the weight of the luminance gradient are calculated for the face candidate region. These values are compared with the gradient and the gradient weight of a preset ideal reference face image. At this time, when the average angle between the gradients is equal to or smaller than a predetermined threshold, the input image is determined to have a face region.

According to Japanese Patent Laid-Open No. 2003-30667, a flesh color region is detected from an image. A human iris color pixel is then detected in the region, thereby detecting the position of an eye.

According to Japanese Patent Laid-Open No. 8-63597, the level of matching between an image and each of a plurality of templates of face shapes is calculated. A template having the highest matching level is selected. If the highest matching level is equal to or more than a predetermined threshold, the region on the selected template is set as a face candidate region. Using this template makes it possible to detect the position of an eye.

According to Japanese Patent Laid-Open No. 2000-105829, an entire image or a designated region of an image is scanned using a nose image pattern as a template. A position that matches the template most is output as the position of the nose. Next, a region above the nose position in the image is assumed to be a region where the eyes exist. The eye existence region is scanned using an eye image pattern as a template, and matching is calculated. An eye existence candidate position set that is a set of pixels whose matching levels are higher than a threshold is obtained. In addition, a continuous region included in the eye existence candidate position set is divided into clusters. The distance between each cluster and the nose position is calculated. A cluster having the shortest distance is decided to be a cluster including an eye, thereby detecting the organ position.

Other examples of the method of detecting a face and organ positions are Japanese Patent Laid-Open Nos. 8-77334, 2001-216515, 5-197793, 11-53525, 2000-132688, 2000-235648, and 11-250267. Many other methods have also been proposed, including Japanese Patent Laid-Open No. 4-24503. In this embodiment, the method is not particularly limited.

As a result of the above-described processing, the number of human faces and the coordinate positions of each face can be acquired.

Once face coordinate positions in an image are known, the average luminance and the average color difference of the face region can be obtained by calculating, for each face region, the average Y, Cb, and Cr values of pixel values included in the face region.

Scene analysis processing can be performed using the feature amount of an image. For the scene analysis processing, a technique described in, for example, Japanese Patent Laid-Open No. 2010-251999 or 2010-273144 may be used. Note that a detailed description of these techniques will be omitted here. The scene analysis can acquire an ID to distinguish the capturing scene such as Landscape, Nightscape, Portrait, Underexposure, and Others.

Note that the present invention is not limited to that acquired by the above-described processing. Using another sensing information is also incorporated in the present invention, as a matter of course.

The sensing information acquired in the above described manner is saved in the database 202.

As the saving format in the database, the sensing information may be described using, for example, a general-purpose format (XML: eXtensible Markup Language) as shown in FIG. 11 and stored.

FIG. 11 shows an example in which the attribute information of each image is classified into three categories and described. The first BaseInfo tag is information added to an acquired image file in advance and representing the image size and capturing time information. This tag includes the identifier ID of each image, the save location where the image file is stored, the image size, and the capturing date/time.

The second SensInfo tag is used to store the result of the above-described image analysis processing. The average luminance, average saturation, and average hue of the entire image and the scene analysis result are stored. In addition, information associated with the face position and face color of each person existing in the image can be described.

The third UserInfo tag can store information input by the user for each image. Details will be described later.

Note that the method of storing image attribute information in the database is not limited to that described above, and any other format is usable.

<Person Grouping Using Personal Recognition Processing>

Next, in step S306 of FIG. 3, processing of generating a group for each person using the face position information detected in step S303 is performed. Automatically grouping person's faces in advance makes it possible to increase the efficiency of the user's operation of naming each person later.

This person group formation is executed using a known personal recognition technique in accordance with a processing procedure shown in FIG. 5.

Note that the personal recognition technique mainly includes two techniques, which is, extracting the feature of an organ such as an eye or a mouth existing in a face and comparing the similarities of the relationships. The technique is described in, for example, Japanese Patent Laid-Open No. 10-232934, and a detailed description thereof will be omitted here. Note that the above-described method is merely an example, and any known method is usable in the present invention.

FIG. 5 is a basic flowchart of the person group generation processing of step S306.

In step S501, the images saved in the secondary storage device are sequentially read out and decoded. In step S502, the database 202 is accessed, and the number of faces included in each image and the position information of each face are acquired. In step S504, normalized face images to be used for personal recognition processing are generated.

The normalized face images are face images obtained by extracting faces existing in the images with various sizes, orientations, and resolutions and converting them into faces having a predetermined size and orientation. Since the positions of organs such as an eye and a mouth are important in personal recognition, each normalized face image preferably has such a size that makes it possible to reliably recognize the organs. When the normalized face images are prepared, it is unnecessary to cope with faces of various resolutions in the feature amount extraction processing.

In step S505, face feature amounts are extracted from the normalized face image. In this case, as a characteristic feature, the face feature amounts include the positions and sizes of organs such as an eye, mouth, and nose and the outline of the face.

In step S506, it is determined whether the face feature amounts are similar to face feature amounts in a database 202a (to be referred to as a face dictionary hereinafter) that stores face feature amounts prepared for each person identifier (ID) in advance. If the determination ends with "YES", the face is determined to belong to the same person and added to the dictionary ID of that person in step S509.

If the determination of step S506 ends with "NO", the current evaluation target face is determined to belong to a person different from those registered in the face dictionary so far. Hence, a new person ID is issued, and the face is added to the face dictionary 202a. The processes of steps S502 to S509 are applied to all face regions detected from the input image group, and the appearing persons are grouped.

Figures 15, 16:
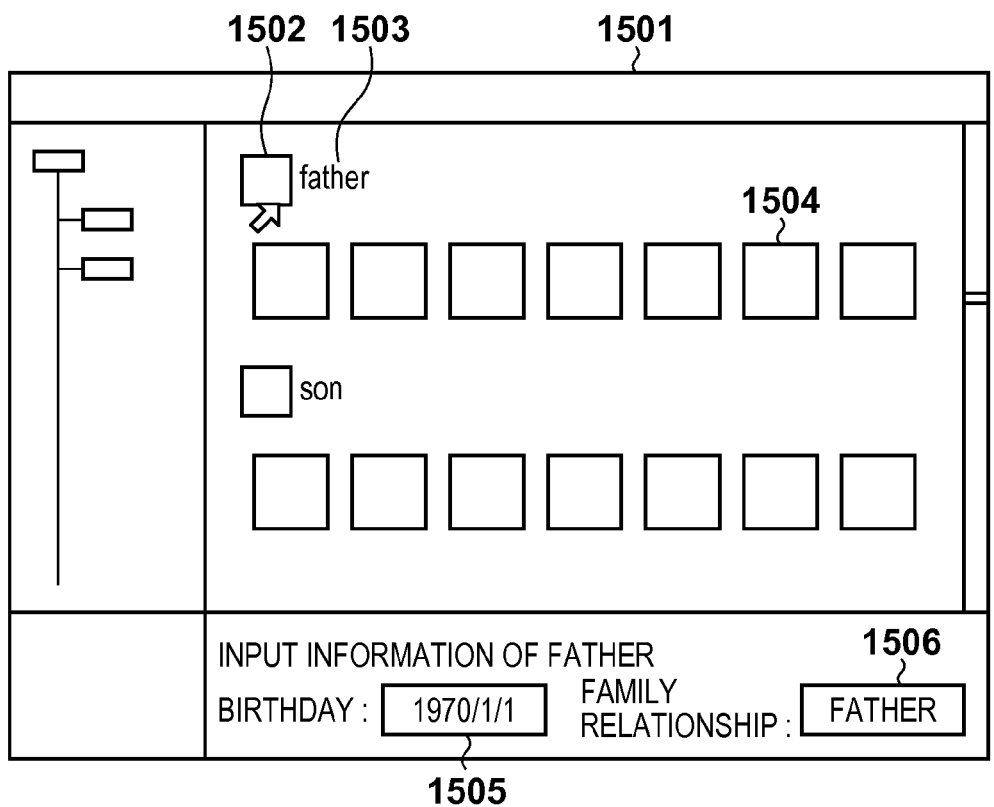
FIG. 15 is a view showing an example of a UI used to manually input person attribute information.
FIG. 16 is a view showing an example of a person attribute information saving format.

The grouping result is described using an ID tag for each face, as shown in the XML format of FIG. 16, and saved in the above-described database 202.

Note that in the above-described embodiment, the person group generation processing is executed after the image sensing processing, as shown in FIG. 3. However, the present invention is not limited to this. For example, as shown in FIG. 4, the sensing processing is executed for all images in step S403. After that, the grouping processing is performed in step S405 using face detection position information. This also makes it possible to generate the same result.

Figure 7:
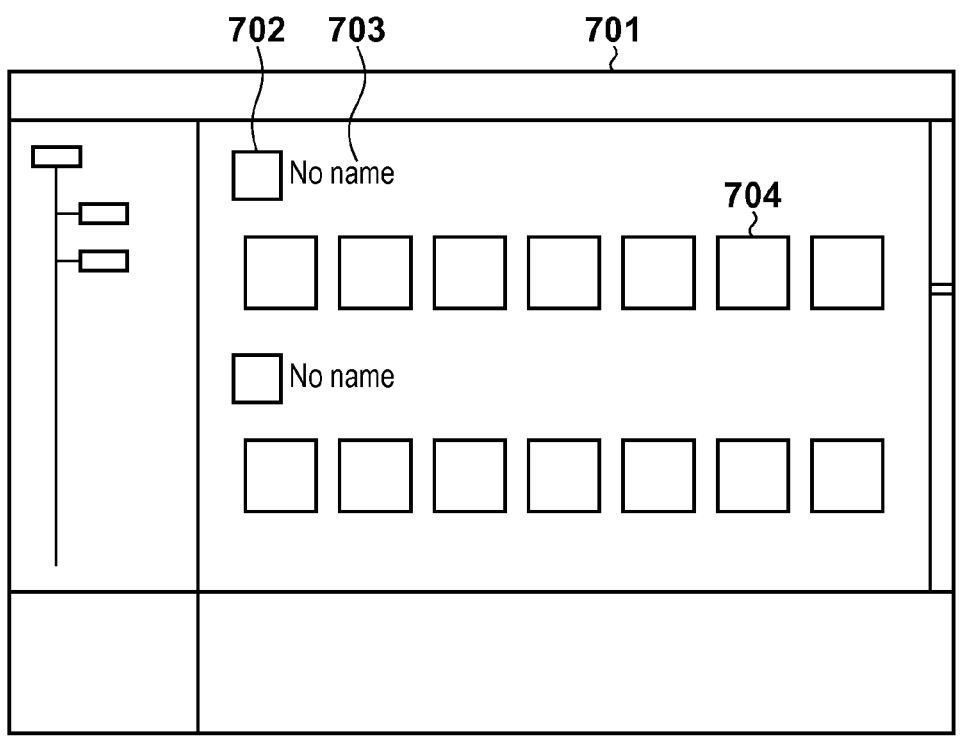
FIG. 7 is a view showing a display example of person groups.

Each person group obtained by the above-described processing is displayed using a UI 701 as shown in FIG. 7. Referring to FIG. 7, reference numeral 702 denotes a representative face image of a person group. A region 703 to display the name of the person group exists on a side. Immediately after the automatic person grouping processing, "No name" is displayed as the person name, as shown in FIG. 7. Reference numeral 704 denotes a plurality of face images included in the person group. In the UI shown in FIG. 7, a person name can be input by designating the "No name" region 703, or information such as the birthday or family relationship can be input for each person, as will be described later.

The sensing processing may be executed using the background task of the operating system so the user who is operating the information processing apparatus 115 does not know it. In this case, the user can continue the sensing processing of the image group even when another operation is being performed on the computer.

<Input of User Information (Person Name, Birthday, Favorite Rate, Etc.)>

In this embodiment, it is also assumed that the user manually inputs various kinds of attribute information about an image.

FIG. 12 shows a list of examples of the attribute information (to be referred to as manually registered information hereinafter). The manually registered information is roughly divided into information set for each image and information set for each person grouped by the above-described processing.

Figure 13:
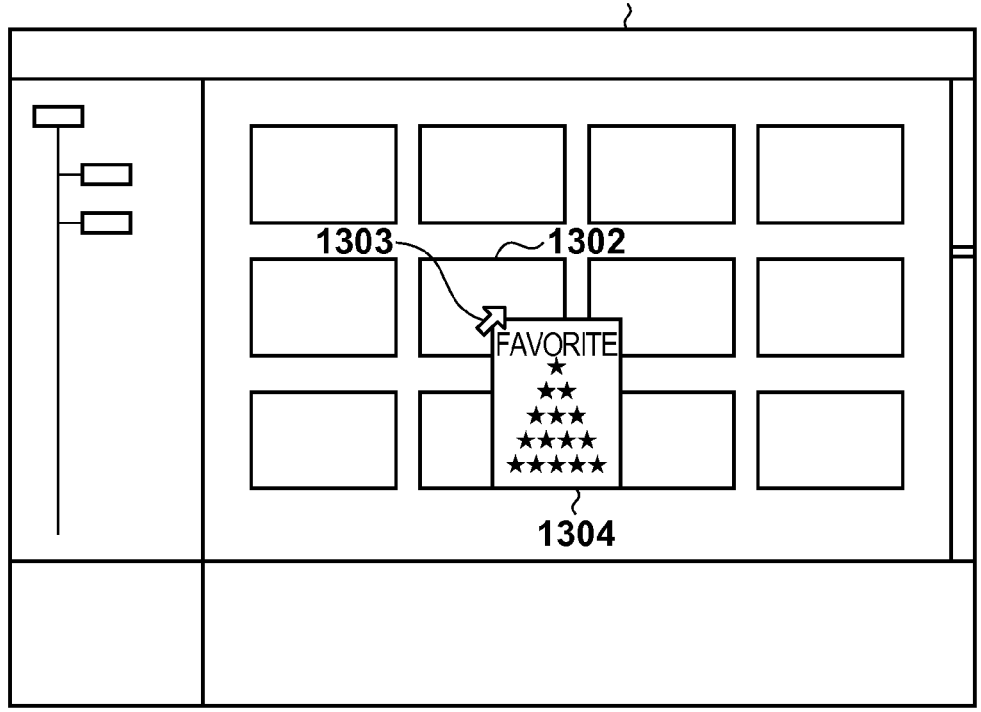
FIG. 13 is a view showing an example of a UI used to manually input the favorite rate.

An example of the information set for each image is the favorite rate of the user. The user can manually stepwise input the favorite rate representing whether the user likes the image. For example, as shown in FIG. 13, the user selects a desired thumbnail 1302 image on a UI 1301 by a pointer 1303 and clicks the right bottom of the pointing device, thereby displaying a dialogue capable of inputting the favorite rate. The user can select the number of star symbols in the menu in accordance with his/her taste. In general, setting is done such that the higher the favorite rate is, the larger the number of star symbols is.

The favorite rate may be set automatically, instead of causing the user to manually input. For example, assume that the user clicks on a desired image file in the state shown in FIG. 8 in which the thumbnail image list is displayed to transit to a single image display screen. The transition count may be measured and set as the favorite rate. That is, it is judged that the larger the viewing count is, the more the user likes the image.

As another example, the printing count may be set as the favorite rate. When a print action is taken, it is judged that the user likes the image, as a matter of course. The favorite rate can be judged to be higher by measuring the printing count.

As described above, the favorite rate can be set by various methods, for example, the user manually sets it, the viewing count is set as the favorite rate, or the printing count is set as the favorite rate. The pieces of set and measured information are individually stored in the UserInfo tag of the database 202 using the XML format as shown in FIG. 11. For example, the favorite rate is represented by a FavoriteRate tag, the viewing count is represented by a ViewingTimes tag, and the printing count is represented by a PrintingTimes tag.

Another information set for each image is event information. Examples of the event information are "travel", "graduation", and "wedding".

Figure 14:
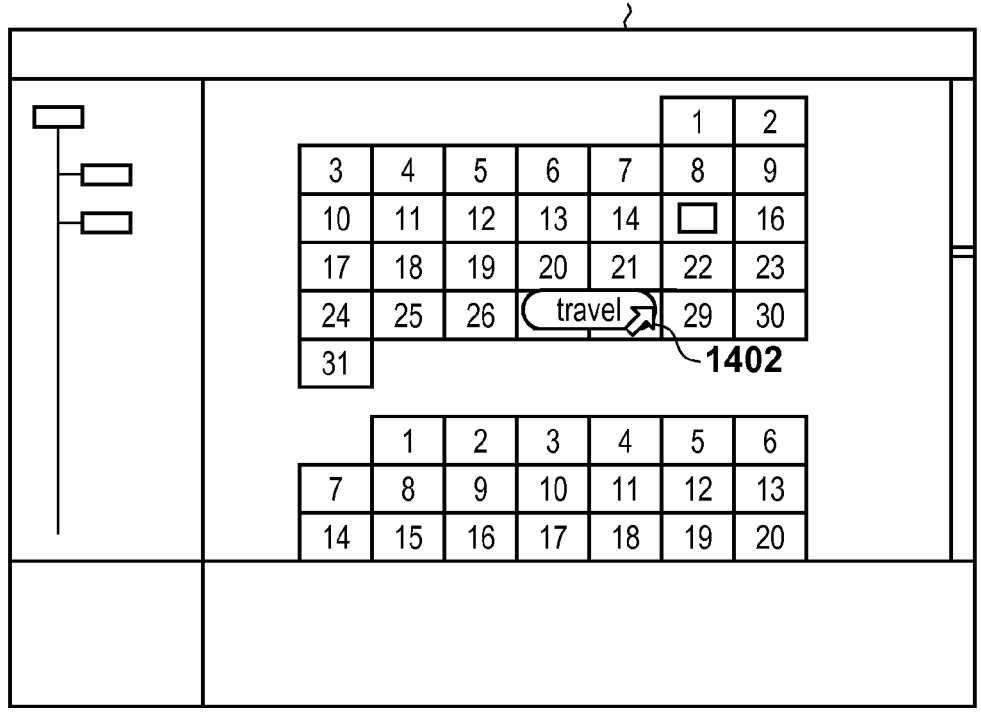
FIG. 14 is a view showing an example of a UI used to manually input event information.

To designate the event, for example, as shown in FIG. 14, a desired date may be designated on a calendar using a pointer 1402 of the pointing device or the like, and the name of the event on that day may be input to set the event. The designated event name is included in the XML format shown in FIG. 11 as part of the image attribute information. In the form shown in FIG. 11, the event name and the image are linked with each other using an Event tag in the Userinfo tag.

Person attribute information that is another manually registered information will be described next.

FIG. 15 shows a UI used to input person attribute information. Referring to FIG. 15, reference numeral 1502 denotes a representative face image of a predetermined person (in this case, "father"). In addition, 1504 displays a list of images detected from other images and judged to have similar face feature amounts in step S506.

After the sensing processing, no name is input for each person group, as shown in FIG. 7. However, an arbitrary person name can be input by designating the "No name" portion 703 using a pointer of the pointing device.

As an attribute of each person, the birthday of the person or the family relationship viewed from the user who is operating the application can also be set. When clicking on the representative face 1502 of the person shown in FIG. 15, the user can input a birthday 1505 and family relationship 1506 of the clicked person, as illustrated on the lower side of FIG. 15.

Unlike the above-described image attribute information linked with the images, the input person attribute information is managed in the database 202 separately from the image attribute information using the XML format as shown in FIG. 16.

<Template Acquisition>

Figure 17:
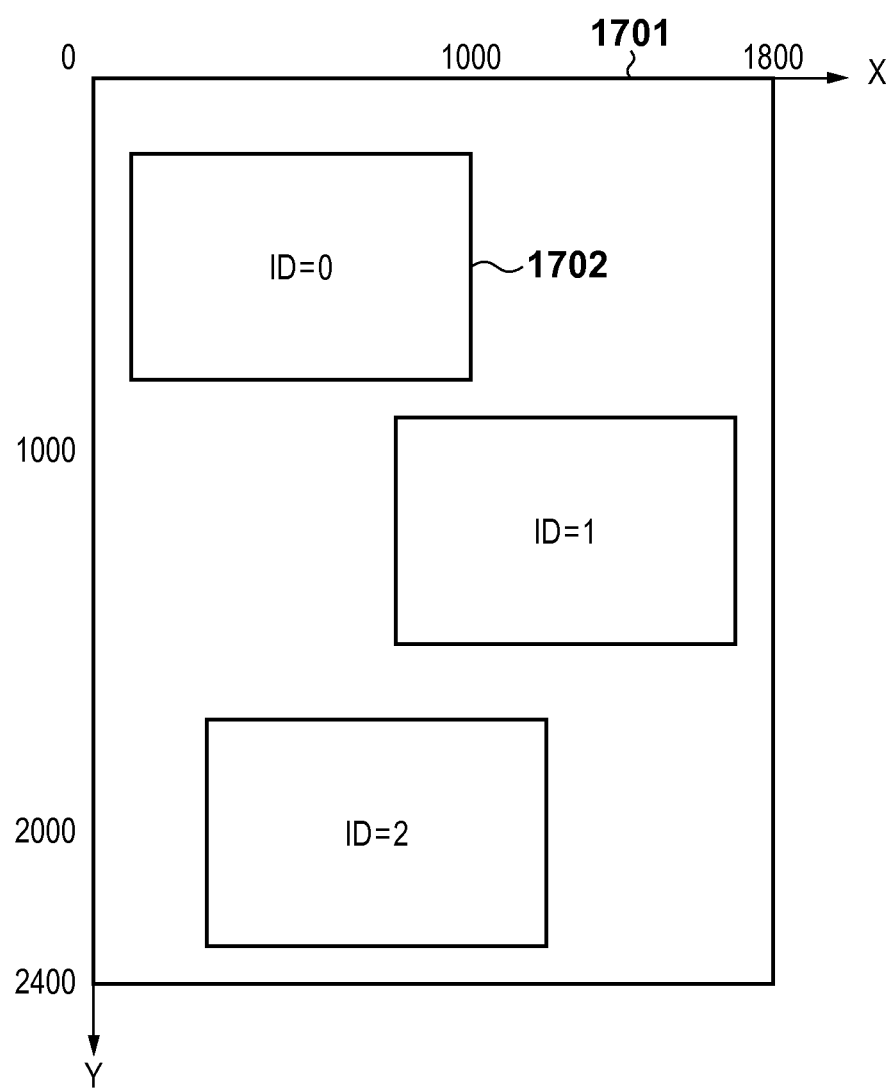
FIG. 17 is a view showing an example of a layout template.
Figure 19:
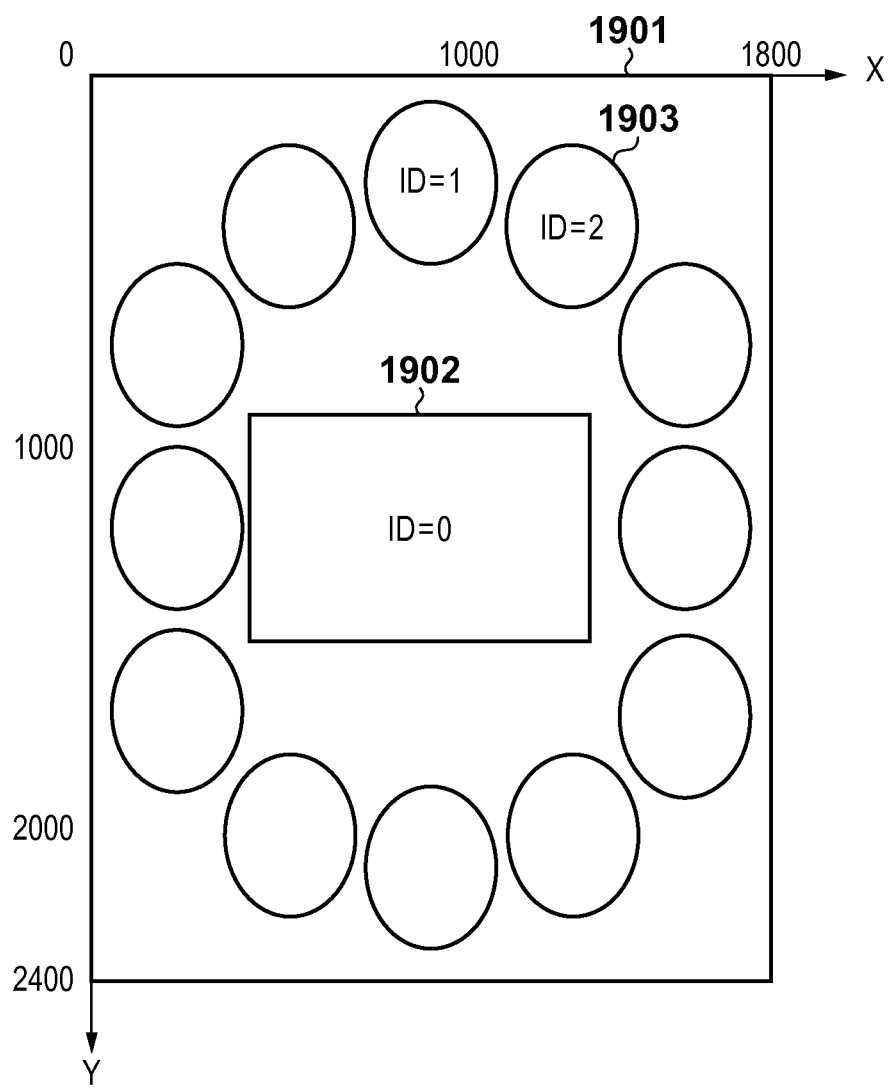
FIG. 19 is a view showing an example of a layout template.

In this embodiment, various layout templates are prepared in advance. Examples of the layout templates are shown in FIGS. 17 and 19. Each layout template includes a plurality of image arrangement frames 1702 or 1902 (to be synonymous with slots hereinafter) on a paper size to lay out images.

A number of such templates are prepared. The templates can be saved in the secondary storage device in advance when the software to execute the embodiment is installed in the information processing apparatus 115. As another method, an arbitrary template group may be acquired from the server 114 existing on the Internet connected via the IF 107 or the wireless LAN 109.

These templates are preferably described in a highly versatile page description language, for example, XML like the above-described sensing result storage. FIGS. 18 and 20 show examples of XML data. In FIGS. 18 and 20, first, a BASIC tag describes the basic information of the layout page. The basic information includes, for example, the theme of the layout, the page size, and the page resolution (dpi). Referring to FIGS. 18 and 20, a Theme tag representing the layout theme is blank in the initial state of the template. As the basic information, the page size is set to A4, and the resolution is set to 300 dpi.

Subsequently, information of each of the above-described image arrangement frames is described by an ImageSlot tag. The ImageSlot tag holds two tags, that is, an ID tag and a POSITION tag to describe the ID and position of the image arrangement frame. The position information is defined on, for example, an X-Y coordinate system having its origin at the upper left corner, as shown in FIG. 17 or 19.

The ImageSlot can also set, for each slot, the shape of the slot and the name of the recommended person group to be arranged.

For example, in the template shown in FIG. 17, all slots have the "rectangle" shape, as indicated by the Shape tag in FIG. 18. As for the person group name, arranging "MainGroup" is recommended by the "PersonGroup" tag.

In addition, in the template shown in FIG. 19, the slot with ID=0 arranged at the center is described as a slot having the rectangle shape, as shown in FIG. 20. As for the person group, arranging "SubGroup" is recommended. The subsequent slots with ID=1, 2, . . . , have the ellipse shape. Arranging "MainGroup" as the person group is recommended.

In this embodiment, holding a number of such templates is recommended.

<Proposal Scenario Decision>

As described above, the application presented in this embodiment can execute analysis processing for an input image group, automatically group persons, and display them on a UI. Viewing the result, the user can input attribute information such as a name and birthday for each person group and set the favorite rate or the like for each image.

It is also possible to hold a number of layout templates classified by the theme.

When the above-described conditions are satisfied, the application of this embodiment performs, at a predetermined timing, processing of automatically generating a collage layout the user is likely to be fond of and presenting it to the user. This will be referred to as layout proposal processing hereinafter.

FIG. 6 is a basic flowchart to perform the proposal processing.

Referring to FIG. 6, in step S601, the scenario of proposal processing is decided. The scenario includes the theme of the layout to be proposed, decision of a template, settings of a person (main character) to be emphasized in the layout, and selection information of an image group to be used for layout generation.

Examples of two scenarios will be described below for the sake of simplicity.

For example, assume that the first birthday of the person "son" automatically grouped in FIG. 15 comes soon. In this case, the theme of the layout to be proposed is decided as "growth". Next, a template is selected. In this case, a template as shown in FIG. 19 suitable for "growth" is selected, and "growth" is described in the Theme tag portion of XML, as shown in FIG. 30. Next, "son" is set as the main character "MainGroup" on which focus is placed at the time of layout. Then, "son" and "father" are set as "SubGroup" on which focus is secondarily placed at the time of layout. An image group to be used for layout is selected. In this example, the database 202 is referred, and an enormous number of images including "son" are extracted and listed out of the images captured so far from the birthday of the person "son". The scenario decision for the growth layout has been described.

As an example different from that described above, upon knowing, based on the event information registered in FIG. 14, that the family traveled several days ago, and an enormous number of images of the travel are saved in the secondary storage device, the scenario decision unit decides a scenario to propose a travel layout. In this case, the theme of the layout to be proposed is decided as "travel". Next, a template is selected. In this case, a layout as shown in FIG. 17 is selected, and "travel" is described in the Theme tag portion of XML, as shown in FIG. 31. Then, "son", "mother", and "father" are set as the main character "Main-Group" on which focus is placed at the time of layout. In this way, a plurality of persons can be set as "MainGroup" by taking advantage of the characteristics of XML. Next, an image group to be used for layout is selected. In this example, the database 202 is referred, and an enormous number of images linked with the travel event are extracted and listed. The scenario decision for the travel layout has been described.

<Layout Generation Processing (Image Selection and Arrangement According to Layout Theme)>

Figure 21:
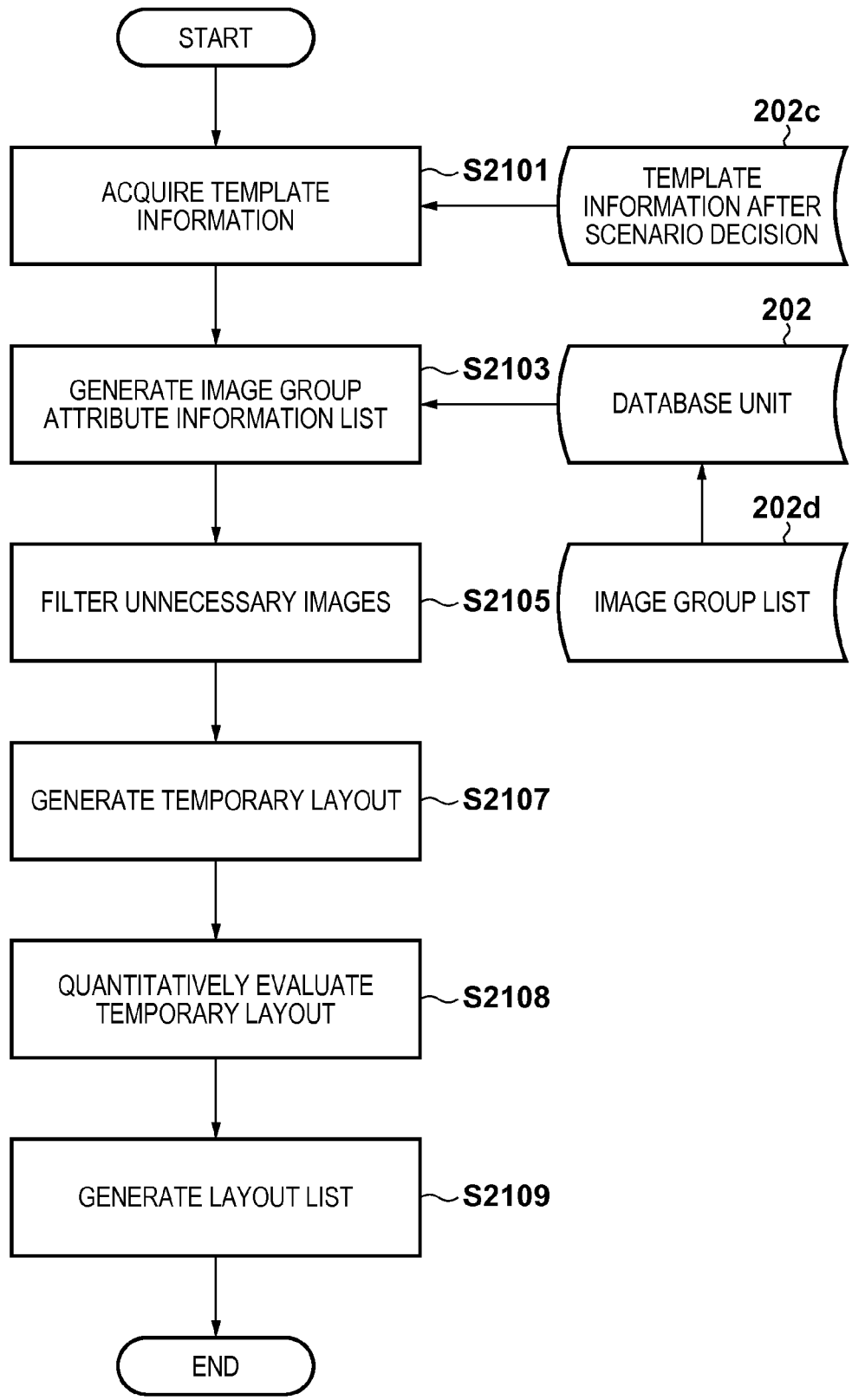
FIG. 21 is a flowchart of automatic layout proposal processing according to the first embodiment.

Next, in step S603 of FIG. 6, automatic layout generation processing based on the above-described scenario is executed. FIG. 21 illustrates the detailed processing procedure of the layout processing unit. Each processing step will be explained below with reference to FIG. 21.

Referring to FIG. 21, in step S2101, template information after the scenario is decided by the above-described scenario generation processing, and the theme and the person group information are set is acquired from a database 202c.

In step S2103, the feature amounts of each image are acquired from the database 202 based on an image group list 202d decided by the scenario, and an image group attribute information list is generated. The image group attribute information list has a structure in which the IMAGEINFO tags shown in FIG. 11 are arranged as many as the number of image lists. The automatic layout generation processing in steps S2105 to S2109 is performed based on the image group attribute information list.

As described above, in the automatic layout generation processing of this embodiment, attribute information saved in the database in advance by performing sensing processing for each image is used, instead of directly handling the image data itself. This aims at avoiding the necessity of a very large memory area to store the image group when the image data itself is used to perform the layout generation processing.

Figure 22:
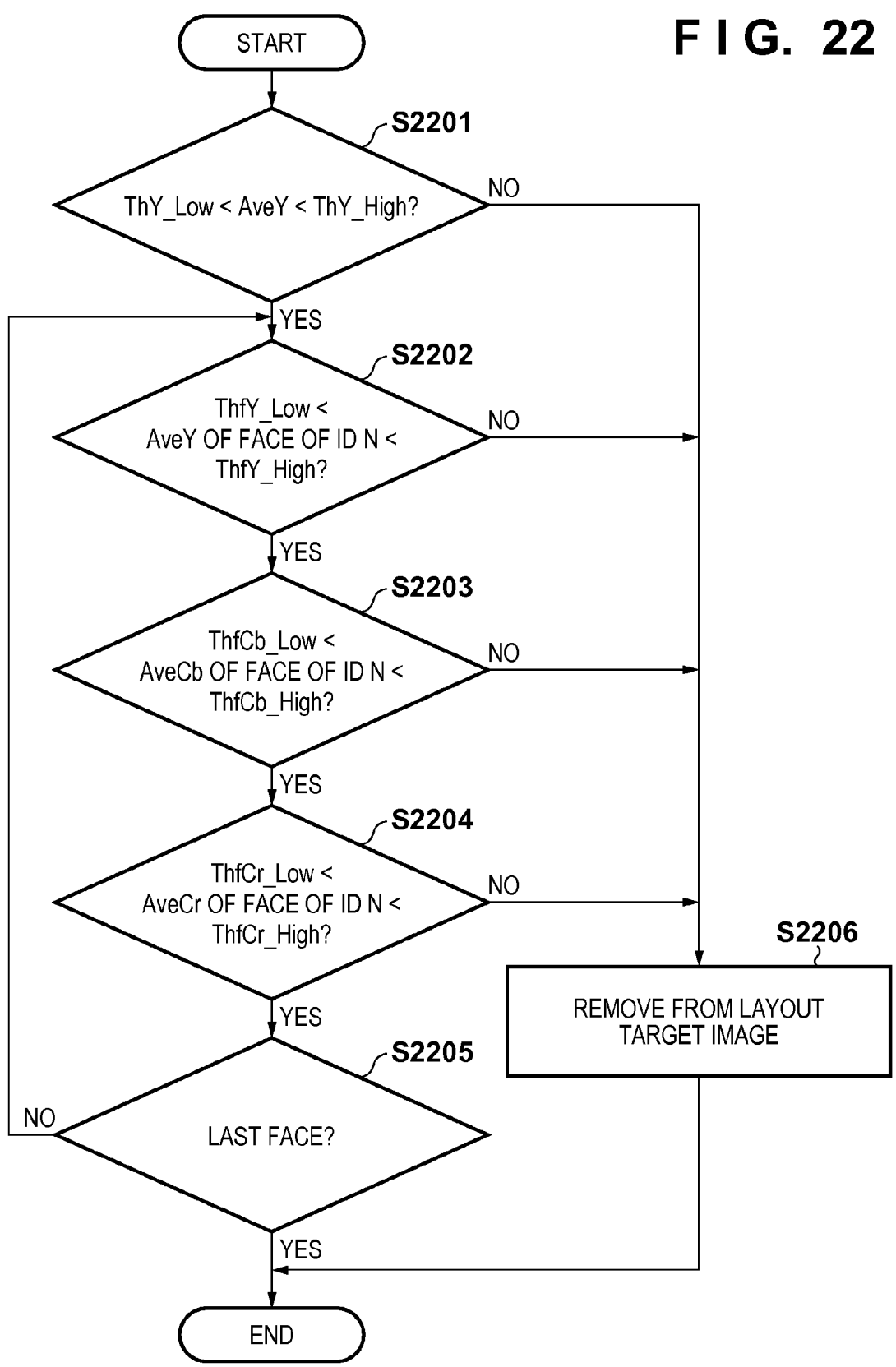
FIG. 22 is a flowchart of unnecessary image filtering processing according to the first embodiment.

In step S2105, unnecessary images are filtered from the input image group using the attribute information of the input image group. The filtering processing is performed in accordance with the procedure shown in FIG. 22. Referring to FIG. 22, in step S2201, it is determined for each image whether the average luminance of the entire image falls within the range of predetermined thresholds (ThY_Low and ThY_High). If NO, the process advances to step S2206 to remove the image of interest from the layout target.

Similarly, in steps S2202 to S2205, whether the average luminance and average color difference components fall within the ranges of predetermined thresholds representing a satisfactory flesh color region is determined for each face region included in the image of interest. Only an image for which all determinations of steps S2202 to S2205 end with "YES" is applied to the subsequent layout generation processing.

Note that since this filtering processing aims at removing images that can obviously be judged as unnecessary for the subsequent temporary layout creation processing, the thresholds are preferably set relatively leniently. For example, in the overall image luminance determination of step S2201, if the difference between ThY_High and ThY_Low is excessively smaller than the image dynamic range, the number of images determined as "YES" accordingly decreases. To prevent this, in the filtering processing of this embodiment, the difference between the thresholds is set as large as possible. In addition, thresholds that can remove an image that is obviously judged as an abnormal image are set.

Next, in step S2107 of FIG. 21, L temporary layouts are generated using the image group determined as the layout target by the above-described processing. The layout generation is performed in accordance with the procedure shown in FIG. 33. Referring to FIG. 33, in step S3301, images to be actually used in layout are selected from the image group filtered in step S2105 of FIG. 21. More specifically, if the number of slots in the template is N, N images are selected. In step S3302, an arrangement parameter to be described later is calculated for each image selected in step S3301 based on theme information 202e. The theme information 202e indicates that described in the template information acquired in step S2101 of FIG. 21. In step S3304, a manipulation parameter to be described later is similarly calculated for each image selected in step S3301 based on the theme information 202e.

Calculation of the arrangement parameter and the manipulation parameter based on a theme will be described below using an example. First, the arrangement parameter will be described. Assume a case in which a scenario to propose the layout of theme "growth" is decided in accordance with the above-described example, and the template shown in FIG. 19 is used. As described above, an image frame 1903 is described as a slot (ID=1, 2, . . . ) having an "ellipse" shape, and "son" is set as the person group "MainGroup" in the XML format shown in FIG. 20. In this case, images are preferably arranged on the template such that the process of growth of the main character "son" can chronologically be followed. That is, the capturing dates/times of the selected images are caused to match the arrangement order of the IDs of the image frames so that the images of the main character are chronologically arranged clockwise in the image frames 1903.

Figures 46, 47:
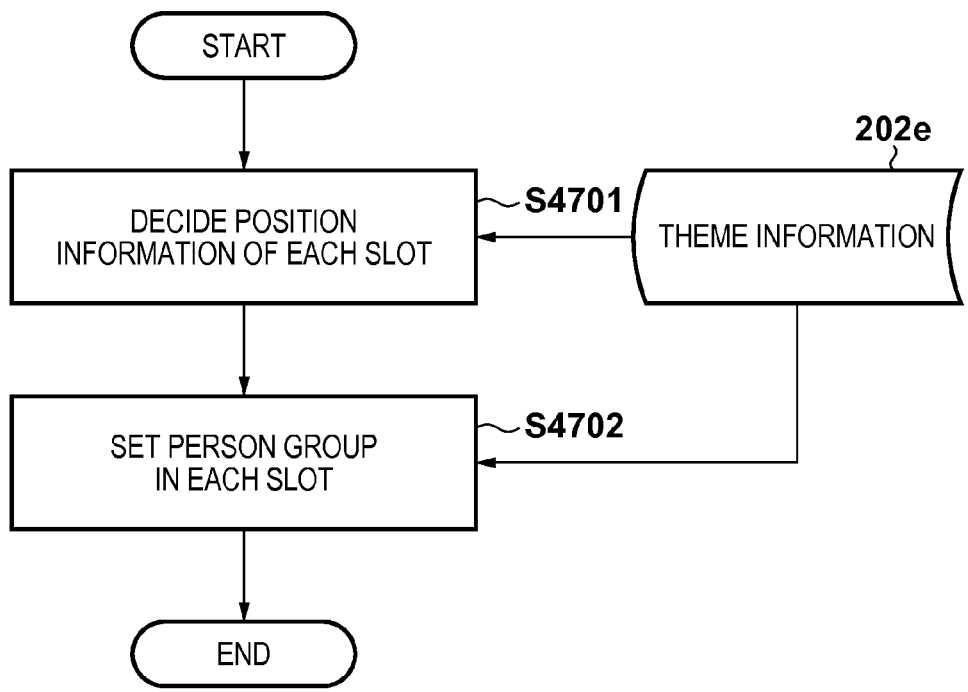
FIG. 46 is a table showing an example of an arrangement parameter calculation criterion according to the first embodiment.
FIG. 47 is a flowchart of slot information generation processing according to the third embodiment.

When the theme is "growth", the images arranged in the layout mainly include the face region of the same person, and the tone does not largely change between the images. On the other hand, when the theme is "travel", the images arranged in the layout mainly include landscapes, and the tone largely changes between the images depending on the type of landscape. In this case, if the images are chronologically arranged, photos of similar landscapes are arranged in adjacent slots at a high possibility. If images of similar tones gather in one layout, the layout is not good. Hence, when the theme is "travel", the selected images are arranged in the order of capturing date/time. When images of adjacent capturing dates/times are arranged in slots farthest from each other, the possibility that the tone balance between the images in the layout improves is high. The distance between the slots on the template is defined as the distance between their center positions. In the template as shown in FIG. 34, a slot 3403 is located farthest from a slot 3402. For example, an image of the latest capturing date/time is arranged in the slot 3402, and an image of the capturing date/time adjacent to that of the image is arranged in the slot 3403. This operation is repeated, thereby generating a layout. As described above, arrangement parameter calculation in this embodiment indicates changing the selected image arrangement algorithm in accordance with the theme, as shown in FIG. 46.

The manipulation parameter will be described next. For example, when creating a layout of theme "growth", a layout in which each slot includes the face of a person of interest in a large size can make an impression. On the other hand, when creating a layout of theme "travel", not only a face but also the background is important. Hence, the face region of a person in each slot need not be so large as in "growth". The ratio of the area of the face region of a person in each slot is defined as FaceRatio, and the average of FaceRatio in all slots on the layout is defined as AveFaceRatio. A trimming parameter is calculated by $$(\text{AveFaceRatio of "travel"}) < (\text{AveFaceRatio of "growth"}) \quad (2)$$

Figure 23:
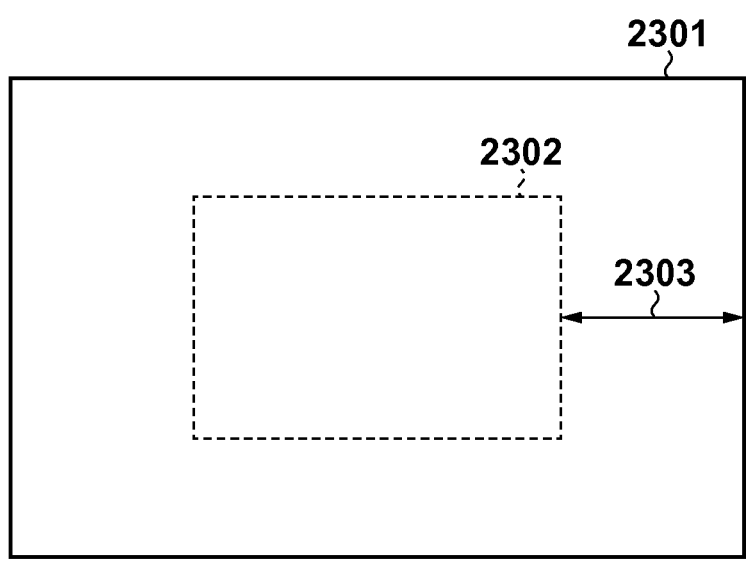
FIG. 23 is a view showing an example of automatic trimming processing.

A manipulation ratio represented by the trimming parameter is, for example, a trimming ratio to be described below. The trimming ratio is a parameter representing what degree of trimming should be done at the time of arrangement of an image, including the object, and is represented by, for example, 0% to 100%. An image is trimmed using the center of the image as the reference, as shown in FIG. 23. Referring to FIG. 23, reference numeral 2301 denotes an entire image; and 2302, a cutting frame (a region that specifies the trimming target) when performing trimming at a trimming ratio of 50%. As another example of the trimming parameter, the trimming distance may be calculated. The trimming distance is the distance of a side of the image before trimming and a corresponding side of the image after trimming, and is calculated as, for example, the value of a distance 2303. Such distances are calculated for all sides of the images. As still another example of the trimming parameter, the coordinates of the four corners of the image after trimming may be calculated. More specifically, the coordinates are the coordinate values of the four corners of the frame 2302.

For example, the trimming parameter is calculated as $$(\text{AveFaceRatio of "travel"}) < 25\%,$$
$$50\% < (\text{AveFaceRatio of "growth"}) \quad (3)$$

In this embodiment, a thus calculated trimming parameter is used as a manipulation parameter.

Based on the above-described image selection/arrangement/trimming criterion, temporary layouts are generated as many as possible. The generated temporary layouts can be expressed by XML, as shown in FIG. 32. The ID of the image selected and arranged in each slot is described by the ImageID tag, and the trimming ratio is described by the TrimmingRatio tag.

Note that the number L of temporary layouts generated here is decided in accordance with the throughput of evaluation processing in a layout evaluation step to be described later and the performance of the information processing apparatus 115 that performs the processing. For example, several hundred thousand or more different temporary layouts are preferably prepared. Each generated layout can be saved together with an ID in the secondary storage device as a file using the XML format shown in FIG. 32, or stored on the RAM using another data structure such as a structure.

Next, in step S2108 of FIG. 21, the L temporary layouts created above are evaluated using predetermined layout evaluation amounts. FIG. 24 shows a list of layout evaluation amounts according to this embodiment. As shown in FIG. 24, the layout evaluation amounts used in this embodiment can mainly be divided into there categories.

The first evaluation category includes the evaluation amounts of each image. The evaluation amounts are used to judge states such as the brightness, saturation, and blur amount of an image and score the states. An example of scoring will be described below. The brightness appropriateness scores 100 when the average luminance falls within a predetermined range, as shown in FIG. 25. The score is set so as to be lower when the average luminance falls outside the predetermined threshold range. The saturation appropriateness scores 100 when the average saturation of the entire image is larger than a predetermined saturation value, as shown in FIG. 26. The score is set so as to gradually decrease when the average saturation is smaller than the predetermined value.

The second evaluation category scores evaluation of matching between an image and a slot. For example, the person matching represents the matching ratio of a person designated for a slot to a person who exists in the image actually arranged in the slot. For example, assume that "father" and "son" are designated for a slot as "Person-Group" designated by XML. At this time, when the two persons are included in the image assigned to the slot, the person matching of the slot scores 100. If only one of the persons is included, the matching scores 50. If neither person is included, the matching scores 0, as a matter of course. The matching in a page is the average value of the matchings calculated for the respective slots.

Figures 27, 28:
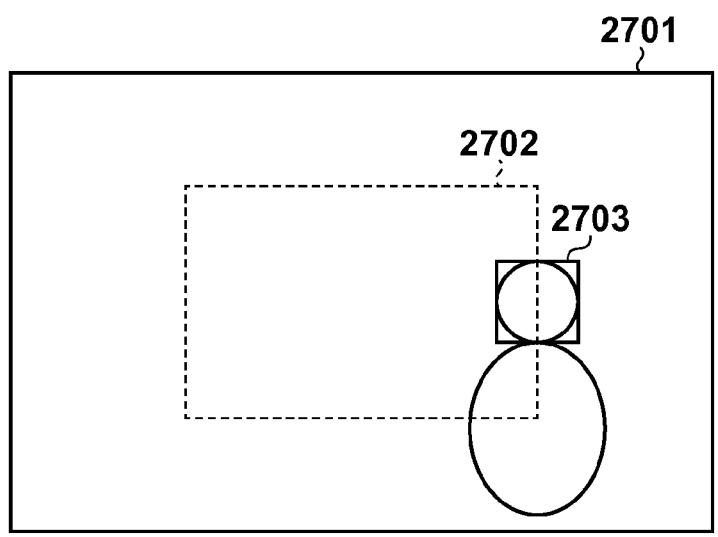
FIG. 27 is a view for explaining trimming loss determination processing.
FIG. 28 is a table for explaining image similarity determination processing.

Another image/slot matching evaluation value is loss determination of a trimming region 2702. For example, when a position 2703 of a face existing in an image is known, as shown in FIG. 27, scores of 0 to 100 are calculated in accordance with the area of the lost portion. If the area of the lost portion is 0, the score is 100. Conversely, if the whole face region is lost, the score is 0.

The third evaluation category evaluates the balance in a layout page. FIG. 24 presents several evaluation values used to evaluate the balance.

The image similarity will be described first. As the image similarity, the similarity between the images is calculated for each of the enormous number of generated temporary layouts. For example, if only similar images that resemble each other are arranged at the time of creating a layout of theme "travel", the layout is not good. For example, the similarity can be evaluated by the capturing date/time. If the capturing dates/times of images are close, there is a high possibility that the images were captured at similar places. However, if the capturing dates/times are far off, both the scenes and the places are different at a high possibility. The capturing date/time can be acquired from the attribute information of each image, which is saved in the database 202 in advance as image attribute information, as shown in FIG. 11. To obtain the similarity from the capturing dates/times, the following calculation is performed. For example, assume that four images as shown in FIG. 28 are laid out in the temporary layout of interest. At this time, the shortest capturing time interval between the four images is calculated. In this case, the time interval of 30 min between image ID "102" and image ID "108" is the shortest. This interval is set as MinInterval and stored in seconds. That is, 30 min=1800 sec. The MinInterval is calculated for each of the L temporary layouts and stored in an array stMinInterval[l]. A maximum value MaxMinInterval in stMinInterval[l] is obtained. A similarity evaluation value Similarity[l] of the lth temporary layout can be obtained by Similarity[$l$]=100×stMinInterval[$l$]/MaxMinInterval (4)

That is, Similarity[l] is effective as the image similarity evaluation value because it is close to 100 as the minimum capturing time interval becomes large, and close to 0 as the time interval becomes small.

The tone variation will be explained next as the evaluation value used to evaluate the balance in a layout page. For example, if only images of similar colors (for example, blue of a blue sky, green of a mountain) are arranged at the time of creating a layout of theme "travel", the layout is not good. In this case, the variance of the average hues AveH of images existing in the lth temporary layout of interest is calculated and stored as a hue variation tmpColorVariance[l]. A maximum value MaxColorVariance in tmpColorVariance[l] is obtained. A color variation evaluation value ColorVariance [l] of the lth temporary layout can be obtained by ColorVariance[$l$]=100×tmpColorVariance[$l$]/
MaxColorVariance (5)

That is, ColorVariance[l] is effective as the hue variation evaluation value because it is close to 100 as the variation of the average hues of the images arranged in a page becomes large, and close to 0 as the variation of the average hues becomes small.

The face size variation will be explained next as the evaluation value used to evaluate the balance in a layout page. For example, if only images of similar face sizes are arranged in a layout result at the time of creating a layout of theme "travel", the layout is not good. Assume that a good layout is obtained when images of a variety of face sizes, including small and large face sizes on a paper sheet after layout, are arranged in balance. In this case, the variance of face sizes (the diagonal distance from the upper left to the lower right of a face position) arranged in the lth temporary layout of interest is stored as tmpFaceVariance[l]. A maximum value MaxFaceVariance in tmpFaceVariance[l] is obtained. A face size variation evaluation value FaceVariance[l] of the lth temporary layout can be obtained by FaceVariance[$l$]=100×tmpFaceVariance[$l$]/
MaxFaceVariance (6)

That is, FaceVariance[l] is effective as the face size variation evaluation value because it is close to 100 as the variation of the face sizes arranged on a paper sheet becomes large, and close to 0 as the variation of the face sizes becomes small.

As another category, user taste evaluation is usable.

The plurality of evaluation values described above, which are calculated for each temporary layout, will be integrated and referred to as a layout evaluation value for each temporary layout hereinafter. Let EvalLayout[l] be the integrated evaluation value of the lth temporary layout, and EvalValue[n] be N evaluation values (including the evaluation values shown in FIG. 24) calculated above. At this time, the integrated evaluation value can be obtained by $$EvalLayout[l] = \sum_{n=0}^{N} EvalValue[n] \times W[n] \quad [7]$$

where W[n] is the weight of each evaluation value of shown in FIG. 24 for each scene. As a characteristic feature, a different weight is set for each layout theme. For example, the themes "growth" and "travel" are compared, as shown in FIG. 24. For the theme "travel", a number of photos whose quality is as high are compared, as shown in FIG. 24. For the theme as possible are preferably laid out in a variety of scenes. For this reason, settings are done with a tendency to emphasize the individual evaluation values of the images and the in-page balance evaluation values. On the other hand, for "growth", whether the main character as the growth target properly matches each slot is more important than the image variation. For this reason, settings are done with a tendency to emphasize the image/slot matching evaluation than in-page balance or the individual evaluation of images.

In step S2109, a layout list LayoutList[k] for layout result display is generated using EvalLayout[l] calculated in the above-described way. For the layout list, an identifier l is stored in descending order of evaluation value out of EvalLayout[l] for a predetermined number of (for example, five) layouts. For example, if the temporary layout created for the 50th time has the highest score, layout list LayoutList[0]= 50. Similarly, after the layout list LayoutList[1], the identifier l for the second highest score is stored.

The flowchart of FIG. 21 has been described above.

<Rendering and Display>

Next, the layout result obtained by the above-described processing is rendered in step S605 of FIG. 6 and displayed, as shown in FIG. 29. In step S605, the layout identifier stored in the layout list LayoutList[0] is read out, and the temporary layout result corresponding to the identifier is read out from the secondary storage device or RAM. In the layout result, as described above, template information and image names assigned to the respective slots existing in the template are set. In step S605, the layout result is rendered based on these pieces of information using the rendering function of the OS operating on the information processing apparatus 115 and displayed, as indicated by 2902 in FIG. 29.

When the user presses a Next button 2904 in FIG. 29, the identifier of layout list LayoutList[1] of the next score is read out. The layout result is rendered and displayed in the same manner as described above. This allows the user to view variations of proposed layouts. The user can also redisplay the layout displayed previously by pressing a Previous button 2903. If the user likes the displayed layout, he/she can press a Print button 2905 to cause the printer 112 connected to the information processing apparatus 115 to print the layout result 2902.

The basic processing procedure according to this embodiment has been described above.

Second Embodiment

In the first embodiment, trimming control has been described as an example of manipulation parameter calculation based on a theme. However, the manipulation parameter according to the present invention is not limited to the trimming ratio. In the second embodiment, an example in which the contrast is changed (corrected) based on a theme using the same arrangement as in the first embodiment will be explained as an example of controlling image manipulation processing other than trimming as well.

Figure 35:
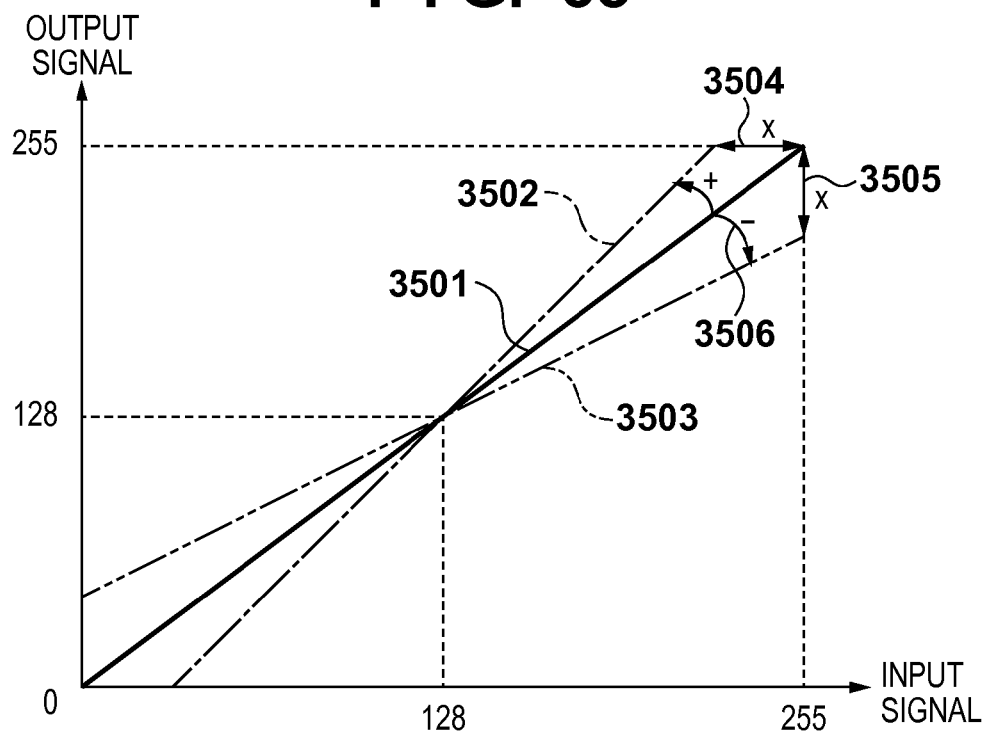
FIG. 35 is a graph showing an example of contrast correction processing.
Figure 36:
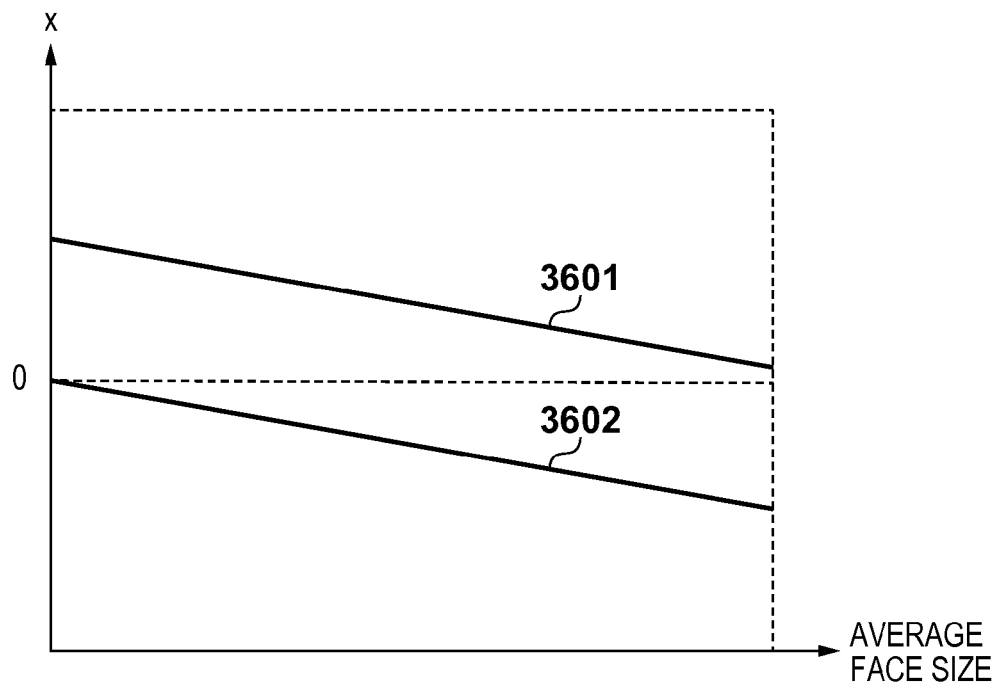
FIG. 36 is a graph for explaining a contrast correction parameter calculation method.

For example, when the theme is "travel", many of the images used in a layout are assumed to include the landscape at the destination. Hence, adjustment is preferably done to raise the contrast and sharpen the images. On the other hand, if the same processing is performed in the theme "growth", the face of the person of interest becomes hard, and the layout is not good. In the theme "growth", it is preferable not to correct the contrast or lower it. The contrast correction is performed as shown in FIG. 35. Referring to FIG. 35, the abscissa of the graph represents the image input signal, and the ordinate represents the image output signal. Reference numeral 3501 denotes an input/output signal characteristic of an image before correction; 3502, an input/output signal characteristic of an image corrected so as to have a high contrast; and 3503, an input/output signal characteristic of an image corrected so as to have a low contrast. The image signal is converted along the line represented by 3502 or 3503, thereby correcting the contrast of the image. At this time, the values of distances 3504 and 3505 on the graph are used as the parameters for contrast correction represented by 3502 and 3503, respectively. Let x be the correction parameter. The correction parameter x has a positive sign when the contrast becomes high or a negative sign when the contrast becomes low, as indicated by 3506. As for calculation of the value x, for example, the value can be decided in accordance with the average face size in all images arranged on a template, as shown in FIG. 36. Referring to FIG. 36, reference numeral 3601 denotes a relationship between the correction parameter x and the average face size in the theme "travel"; and 3602, a relationship between the correction parameter x and the average face size in the theme "growth". With the setting as shown in this graph, when the area of the face in the layout becomes large, processing can be performed to make the contrast higher in the theme "travel" while preventing the face from becoming hard by lowering the contrast. As described above, in this embodiment, the correction parameter x calculated in the above-described way is used as the manipulation parameter, which is calculated in step S3304 of the layout generation procedure shown in FIG. 33.

The thus generated layout is expressed by XML as shown in FIG. 37. The contrast correction processing is described by the Contrast tag.

Note that these image processes (editing processes) are actually executed at the time of rendering by a rendering unit 206 or at the time of print data generation by a print data generation unit 207.

Third Embodiment

In the first embodiment, an example has been described in which a template has, in advance, the position information of each image frame and the information of a recommended person group to be arranged in the image frames, and a layout is created by arranging selected images in the image frames at the fixed positions. However, the present invention is not limited to this. In the third embodiment, an example will be described in which a layout is created using a general-purpose template in which the position information of each image frame and the information of a recommended person group to be arranged in the image frames are not held in advance by the same arrangement as in the first embodiment. Arrangement parameters are calculated to dynamically decide the position information of each image frame and the information of a recommended person group to be arranged in the image frames in accordance with a theme.

FIG. 38 shows an example of a general-purpose template in which slot information is not decided. FIG. 39 shows XML data of the general-purpose template. In the XML data, slot information (for example, described by an ImageSlot tag and including an ID tag, a POSITION tag, a Shape tag, and a PersonGroup tag) as shown in FIG. 18 or 20 is still absent at this point of time. An example will be described below in which the slot position information and the information of a recommended person group to be arranged in the image frames are dynamically calculated in accordance with a theme in the general-purpose template.

FIG. 47 illustrates a processing procedure according to this embodiment. Theme information 202e indicates theme information in the proposal scenario decided in step S601 or the information described by the Theme tag in the XML data shown in FIG. 39. Referring to FIG. 47, in step S4701, the position information of each slot is first calculated based on the theme information 202e.

Figure 40:
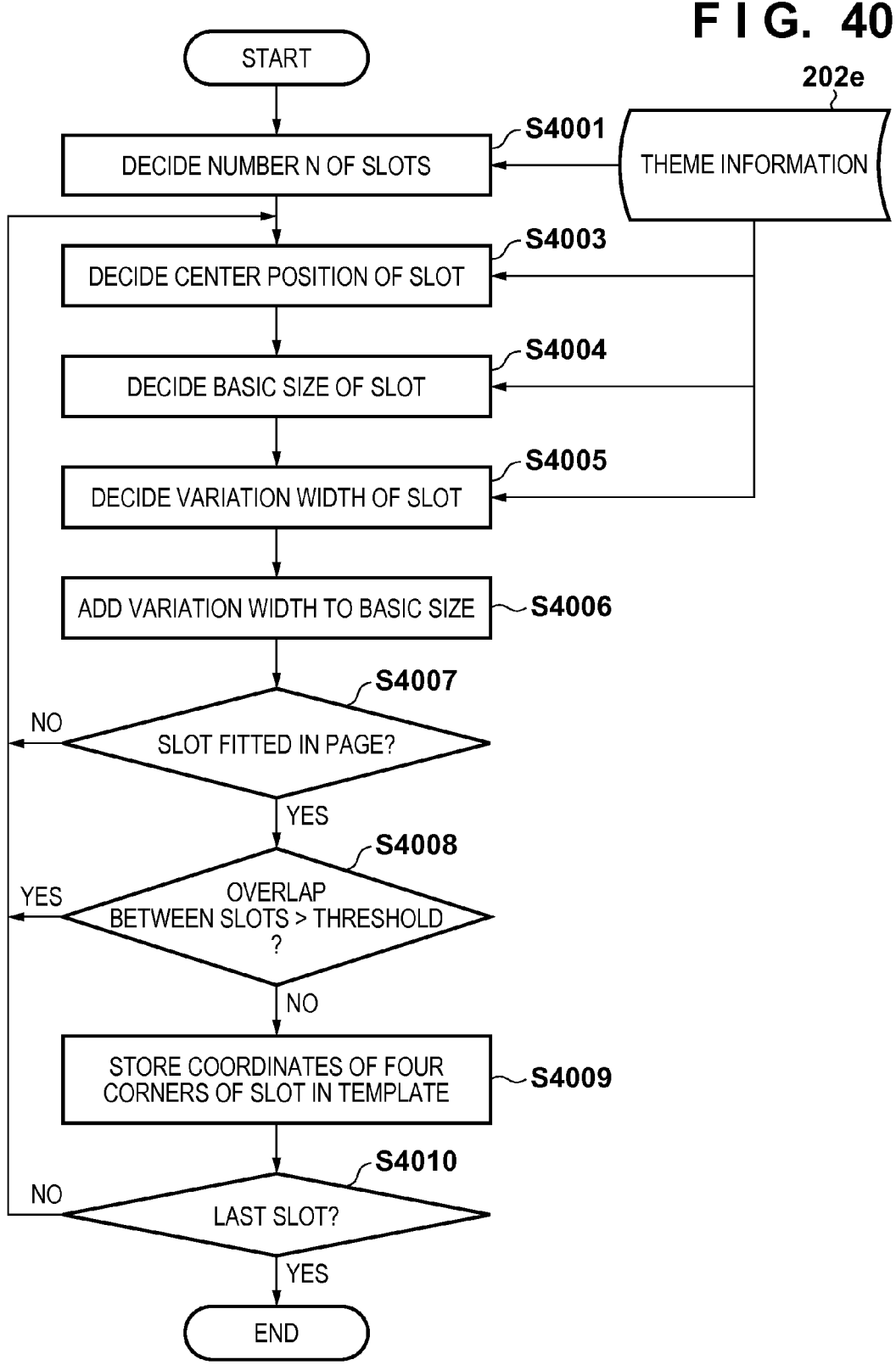
FIG. 40 is a flowchart of slot position information calculation processing according to the third embodiment.

FIG. 40 illustrates the detailed processing procedure of deciding the position information of each slot in accordance with a theme. Each processing step will be described below with reference to FIG. 40.

First, in step S4001, the number N of slots is decided based on the theme information 202e. The theme information 202e indicates theme information in the proposal scenario decided in step S601 or the information described by the Theme tag in the XML data shown in FIG. 39. For example, if the theme is "growth", a layout including many slots is preferable as a layout showing the process of growth of a person of interest because many images of the person of interest can be used. On the other hand, if the theme is "travel", the size of each slot is preferably large to some extent so that a clear view of a landscape photo assumed to be mainly arranged in each slot can be obtained. Hence, the number of slots need not be so large. The number N of slots is therefore calculated so as to meet (number $N$ of slots in "travel")<(number $N$ of slots in "growth") (8)

For example, as shown in FIG. 41, the upper and lower limits of the number N of slots are set in accordance with the theme. The value N can be decided within the range at random. In the XML data shown in FIG. 39, N ImageSlot tags are created based on the decided value, and ID tags of 0 to (N−1) are assigned.

Figure 43:
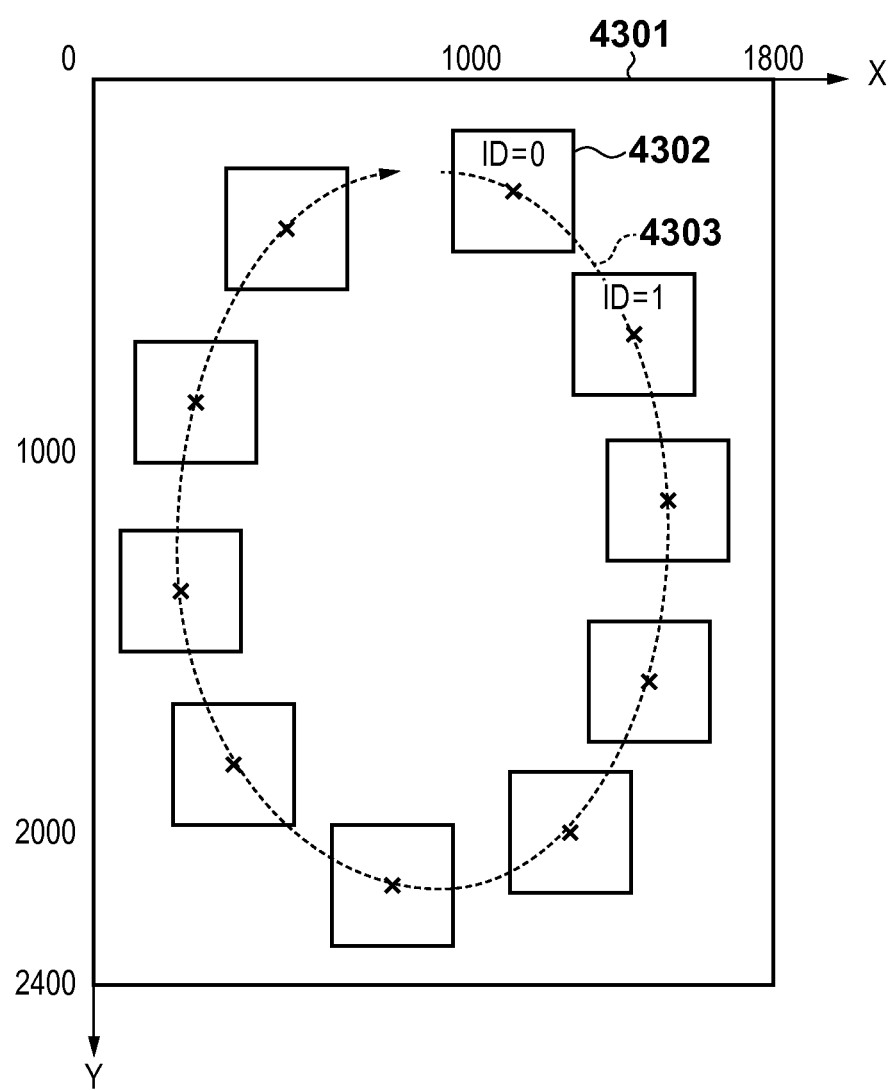
FIG. 43 is a view showing another example of slot arrangement.

Next, a series of processes of steps S4003 to S4010 is performed for each slot. In step S4003, the center position of a slot is decided based on the theme information 202e. For example, in the theme "growth", a good layout can be obtained when the slots are arranged periodically to some extent so that the process of growth of the person of interest can be known by the arrangement of the images. For example, as shown in FIG. 42, the center positions of the slots are decided so that they are arranged linearly as indicated by 4203 or 4204. As another example, the center positions of the slots may be decided so that they are sequentially arranged on an ellipse indicated by 4303 in FIG. 43. On the other hand, when the theme is "travel", the center positions of the slots can be decided at random without such a constraint.

Figure 44:
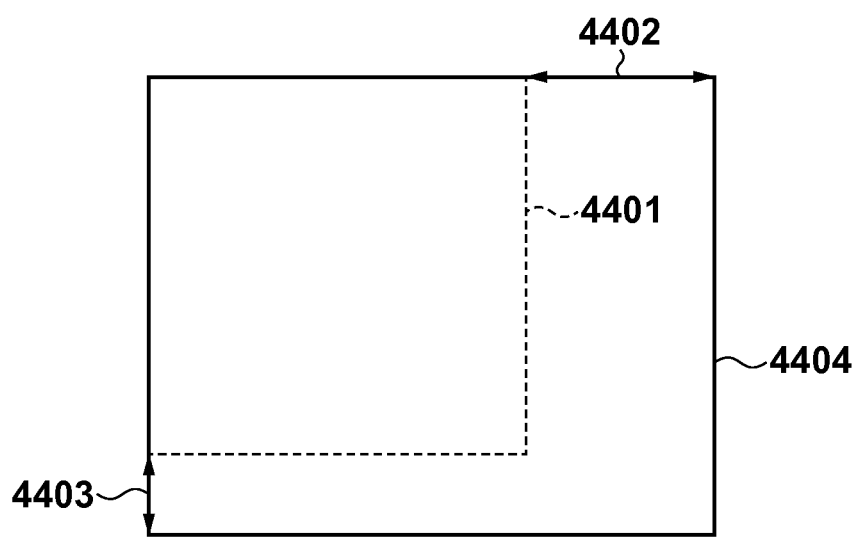
FIG. 44 is a view for explaining a slot size calculation method.

Next, in steps S4004 to S4006, the size of the slot (to be synonymous with slot size hereinafter) is decided. The slot size is calculated by randomly adding (or subtracting) a variation width corresponding to a theme to (or from) each side of a basic size determined in accordance with the theme. FIG. 44 shows an example in which the variation width is added to each size of the basic size. Reference numeral 4401 denotes a basic size of the slot; 4402, a variation width for a horizontal size; 4403, a variation width for a vertical size; and 4404, a finally decided slot size. This will be described below again using an example with reference to the processing procedure shown in FIG. 40. In step S4004, the basic size of the slot is decided based on the theme information 202e. For example, when the theme is "growth", the number N of slots needs to be set large for easier understanding of the process of growth of the person of interest, although the basic size of each slot need not be so large, as described above. On the other hand, if the theme is "travel", the basic size of each slot needs to be set large to some extent so that a clear view of a landscape photo assumed to be mainly arranged in each slot can be obtained. Hence, when the basic size of a slot is defined as BasicSize, the basic size of the slot is calculated so as to meet $$(\text{BasicSize of "growth"}) < (\text{BasicSize of "travel"}) \quad (9)$$

As the value of the basic size, for example, a value as shown in FIG. 41 can be set in accordance with the theme. Alternatively, the basic size may be calculated in accordance with the page size of the template and the number N of slots decided in step S4001.

In step S4005, the variation width to be added to each side of the basic size is calculated based on the theme information 202e. The variation width is decided at random from values in a range determined in accordance with the theme. For example, in the theme "growth", the slots are preferably arranged periodically to some extent so that the process of growth of the person of interest can be known by the arrangement of the images. For this reason, the slot sizes are preferably relatively uniform. Hence, the value of the variation width needs to be set not so large. On the other hand, when the theme is "travel", the slot sizes need not be uniform. A layout abounding in variety can be generated by setting a large variation width. Hence, the upper and lower limits of the variation width are set in accordance with each theme so as to meet $$(\text{upper limit of variation width for "growth"}) < (\text{upper limit of variation width for "travel"}) (\text{lower limit of variation width for "growth"}) < (\text{lower limit of variation width for "travel"}) \quad (10)$$

A value in the corresponding range is employed at random in accordance with the theme, thereby calculating the variation width for the theme.

The upper and lower limits according to the theme can be set as shown in, for example, FIG. 41. Alternatively, the variation width may be calculated in accordance with the page size of the template and the number N of slots decided in step S4001.

In step S4006, the basic size decided in step S4004 and the variation width decided in step S4005 are added, thereby deciding the slot size. When the center position and slot size of a slot are calculated in the above-described manner, the position information of the slot can uniquely be determined. In step S4007, it is determined whether the generated slot is fitted in the page defined by the template size. If the determination ends with "NO", the process returns to step S4003 to regenerate the slot. If YES, the process advances to step S4008. In step S4008, the overlap of the newly generated slot and another slot that has already been generated is evaluated. If the overlap area of the generated slots is too large, the layout is not good. The determination is done by calculating, as an overlap ratio, the ratio of the area of overlap between the newly generated slot and the already generated slot to the area of the newly generated slot and comparing the overlap ratio with a preset threshold. For example, the threshold can be set to 10%. Alternatively, the threshold may be calculated in accordance with the page size of the template and the number N of slots decided in step S4001. Upon determining that the overlap ratio is higher than the threshold, the process returns to step S4003 to regenerate the slot. If the overlap ratio is equal to or lower than the threshold, the process advances to step S4009. In step S4009, the coordinates of the four corners of the generated slot are stored in the template information as the position information of the slot. More specifically, in data of the XML format as shown in FIG. 45, a POSITION tag is generated in each ImageSlot tag, and the coordinates of the four corners are described. The processing procedure of steps S4003 to S4010 is performed until the pieces of position information of all the slots are decided.

Next, in step S4702, the recommended person group to be arranged in each slot is set in accordance with the theme information 202e. For example, if the theme is "growth", the images of the person of interest are preferably arranged in all image frames of the template. On the other hand, if the theme is "travel", a layout more suitable for the theme can be obtained by arranging not only the images of the person of interest but also landscape images. Hence, when defining PersonRatio as the ratio of images in which the person of interest is arranged to all arranged images, the recommended person group to be arranged in each slot is set so as to meet $$(\text{PersonRatio for "travel"}) < (\text{PersonRatio for "growth"}) \quad (11)$$

For example, when the theme is "growth", PersonRatio can be set to 100%, as shown in FIG. 41. In this case, more specifically, the PersonGroup tag is created in all ImageSlot tags, and "MainGroup" is set in the data of the XML format of the template. On the other hand, when the theme is "travel", PersonRatio can be set to 50%, as shown in FIG. 41. For example, when the number N of slots is 4, the PersonGroup tag is created in each of two ImageSlot tags, and "MainGroup" is set. No PersonGroup tag is set in the remaining two ImageSlot tags. As the detailed former slots in which the PersonGroup tag is to be created, for example, two slots close to the center of the template plane can be selected. Alternatively, two slots may be selected sequentially from all slots in descending order of slot size.

The thus generated template is expressed by XML as shown in FIG. 48. The Shape tag that defines the shape of each slot is "rectangle in FIG. 48. However, "circle" or "ellipse" may be set. The thus generated template information is acquired in step S2101, and a layout is generated in accordance with the processing procedure of steps S2101 to S2109.

The basic processing procedure according to this embodiment has been described above. In this embodiment, the number N of slots, the center position of a slot, the basic size of a slot, the variation width of each side of a slot, the coordinate values of the four corners of a slot, and the ratio of the images of a person of interest to all arranged images, which are calculated in the above-described way, are used as the arrangement parameters. These arrangement parameters are controlled in accordance with the theme, thereby generating a layout more suitable for the theme.

The above-described embodiments are merely means for obtaining the effects of the present invention. If the same effects as in the present invention are obtained using another similar method or different parameters, the method or parameters are incorporated in the present invention.

The present invention is also applicable to a system including a plurality of devices (for example, host computer, interface device, reader, and printer) or an apparatus (for example, printer, copying machine, or facsimile apparatus) including a single device.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-154012, filed Jul. 9, 2012, which is hereby incorporated by reference herein in its entirety.

What is claimed is:

1. An album displaying method performed by a processor by executing a program stored in a memory, the album displaying method comprising:
   analyzing faces included in a plurality of images;
   causing a display apparatus to display (a) a first face image corresponding to a first face of a first person and (b) a second face image corresponding to a second face of a second person, based on an analysis result of the faces included in the plurality of images;
   inputting a predetermined instruction by a user regarding a face image, of the first face image and the second face image displayed by the display apparatus;
   setting a person, of the first person and the second person, as a main character, based on the predetermined instruction input by the user;
   selecting images of the person set as the main character, in accordance with the setting; and
   causing the display apparatus to display an album in which the selected images are laid out on a template.

2. The album displaying method according to claim 1, further comprising causing the display apparatus to display a screen in which the user is able to designate a day, wherein each image that includes a face of the person set as the main character and corresponds to the day designated by the user in the screen displayed by the display apparatus is selected.

3. The album displaying method according to claim 1, wherein the person to which a timing corresponding to an output timing of the album is designated by the predetermined instruction, is set as the main character.

4. The album displaying method according to claim 1, further comprising determining a theme of the template,
   wherein the album is displayed by the display apparatus such that the selected images are laid out on the template of the determined theme.

5. The album displaying method according to claim 4, further comprising editing the selected images, using an editing process corresponding to the determined theme,
   wherein the album is displayed by the display apparatus such that the selected and edited images are laid out on the template of the determined theme.

6. The album displaying method according to claim 5, wherein a region of an editing target, in each of the selected images, is specified in accordance with the theme.

7. The album displaying method according to claim 6, wherein a color of the region specified is changed to a color corresponding to the determined theme.

8. The album displaying method according to claim 4, wherein images in a number or a size corresponding to the determined theme are selected.

9. The album displaying method according to claim 4, wherein in the album, the selected images are laid out on the template such that each image is arranged at an arrangement position corresponding to the determined theme.

10. The album displaying method according to claim 4, wherein in the album, the selected images are laid out on the template such that each image is arranged in an arrangement order corresponding to the determined theme.

11. The album displaying method according to claim 1, wherein in the album, the selected images are laid out on the template, in accordance with an arrangement order based on time information corresponding to each image.

12. The album displaying method according to claim 1, wherein in the selecting, images of the person set as the main character are selected, based on the analysis of faces included in the selected images.

13. The album displaying method according to claim 12, wherein in the selecting, images of the person set as the main character are selected, based on the analysis result used for the display of the first face image and the second face image.

14. The album displaying method according to claim 1, further comprising classifying the faces in the plurality of images into a plurality of groups, based on the analysis result of the faces included in the plurality of images,
   wherein the first face image corresponding to a first group of the first face and the second face image corresponding to a second group of the second face are displayed by the display apparatus.

15. The album displaying method according to claim 14, wherein in the selecting, the images of the person set as the main character are selected, based on a group of a face of the person set as the main character.

16. The album displaying method according to claim 1, wherein the first face image and the second face image are displayed as distinguished from each other, based on the analysis result of the faces included in the plurality of images.

17. The album displaying method according to claim 16, wherein the first face image and the second face image are displayed in different display areas distinguished from each other.

18. The album displaying method according to claim 17, wherein the first face image and the second face image are displayed, on a display screen of the display apparatus, in different display areas arranged in a vertical direction.

19. A non-transitory computer-readable storage medium storing a program that causes a computer to:
   analyze faces included in a plurality of images;
   cause a display apparatus to display (a) a first face image corresponding a first face of a first person and (b) a second face image corresponding to a second face of a second person, based on an analysis result of the faces included in the plurality of images;
input a predetermined instruction by a user regarding a face image, of the first face image and the second face image displayed by the display apparatus;
set a person, of the first person and the second person, as a main character, based on the predetermined instruction input by the user;
select images of the person set as the main character, in accordance with the setting; and
cause the display apparatus to display an album in which the images selected are laid out on a template.

20. The storage medium according to claim 19, wherein the program further causes the computer to cause the display apparatus to display a screen in which the user is able to designate a day, and
wherein the images which include a face of the person set as the main character, and which correspond to the day designated by the user in the screen displayed by the display apparatus, are selected.

21. The storage medium according to claim 19, wherein the person to which a timing corresponding to an output timing of the album is designated, is set as the main character.

22. The storage medium according to claim 19, wherein the program further causes the computer to determine a theme of the template, and
wherein the album is displayed by the display apparatus such that the selected images are laid out on the template of the determined theme.

23. The storage medium according to claim 22, wherein the program further causes the computer to function to edit the images selected, using an editing process corresponding to the theme determined, and
wherein the album is displayed by the display apparatus such that the selected and edited images are laid out on the template of the determined theme.

24. The storage medium according to claim 23, wherein a region of an editing target in each selected image is specified in accordance with the determined theme.

25. The storage medium according to claim 22, wherein images in a number or a size corresponding to the determined theme are selected.

26. The storage medium according to claim 19, wherein in the album, the images selected are laid out on the template, in accordance with an arrangement order based on time information corresponding to each of the images.

27. An album displaying apparatus comprising:
a memory configured to store a program;
a processor configured to execute the program stored in the memory,
wherein the processor analyzes faces included in a plurality of images, and causes a display apparatus to display (a) a first face image corresponding to a first face of a first person and (b) a second face image corresponding to a second face of a second person, based on an analysis result of the faces included in the plurality of images, and
wherein the processor inputs a predetermined instruction by a user regarding a face image, of the displayed first face image and the displayed second face image, and sets, as a main character, a person, of the first person and the second person, based on the predetermined instruction input by the user, and
wherein the processor selects images of the person set as the main character, in accordance with the setting, and causes the display apparatus to display an album in which the selected images are laid out on a template.

* * * * *